(12) United States Patent
DeVore, III

(10) Patent No.: US 6,283,537 B1
(45) Date of Patent: Sep. 4, 2001

(54) MULTIFUNCTION TRAILER

(76) Inventor: Phillip A. DeVore, III, 2551 Comanche Dr., Birmingham, AL (US) 35244

(*) Notice: Subject to any disclaimer, the term of this patent is extended or adjusted under 35 U.S.C. 154(b) by 0 days.

(21) Appl. No.: 09/499,275

(22) Filed: Feb. 7, 2000

Related U.S. Application Data

(63) Continuation of application No. 09/195,009, filed on Nov. 18, 1998, now abandoned, which is a continuation of application No. 08/890,969, filed on Jul. 9, 1997, now abandoned.

(51) Int. Cl.$^7$ ..................................................... B60P 3/14
(52) U.S. Cl. .......................................... 296/181; 296/168
(58) Field of Search ................................... 296/181, 182, 296/168, 24.1, 61

(56) References Cited

U.S. PATENT DOCUMENTS

| | | | |
|---|---|---|---|
| 3,705,743 | * | 12/1972 | Toomey ................................ 296/168 |
| 4,133,572 | * | 1/1979 | Robbins et al. ..................... 296/168 |
| 4,273,351 | * | 6/1981 | Salamander ....................... 296/159 X |
| 4,537,441 | * | 8/1985 | McCleary .......................... 296/168 X |
| 4,607,876 | * | 8/1986 | Reed ................................. 296/159 X |
| 4,682,618 | * | 7/1987 | Zwick .................................... 135/89 |
| 4,981,318 | * | 1/1991 | Doane et al. ..................... 296/181 X |
| 5,314,200 | * | 5/1994 | Phillips ............................ 296/168 X |
| 5,383,698 | * | 1/1995 | Buchholz ......................... 296/181 X |
| 5,383,703 | * | 1/1995 | Irvine, III ............................. 296/181 |

* cited by examiner

Primary Examiner—Joseph D. Pape
(74) Attorney, Agent, or Firm—L. F. Hilbers

(57) ABSTRACT

The Invention, a multipurpose utility trailer which converts into a workport or a camper, attaches to a standard axle assembly to become transportable. The frame, skeleton, and body components are welded coated steel, the cargo deck is pressure treated plank and the front deck and steps are coated expanded steel.

The Invention is topped with detachable aluminum back cowling panels and a swing-up aluminum nose cowling which all interlock to create a flat, non-corrosive, self draining covering which is suitable for an elevated cargo or bunk platform. Removal of the back cowling panels exposes an open cargo deck with permanent sidewalls. Back cowling panels can be inserted into channels in the tailgate, thus becoming loading ramps. The nose cowling swings up to become a shielded counter top and the front compartment wall swings down and extends across swing-out braces becoming a camper floor. The swing-out braces accommodate canopy struts which support a canopy system, converting the Invention into a sheltered workport or camper.

The steel tongue is adjustable in height and accommodates the swing-out steps at any height. Parking jacks are welded to the frame. Fittings are affixed about the core unit for attaching a flexible rail system and accessories. A removable divider panel forms a divider between front and rear cargo compartments. The removable tailcap, which is also a straightedge and level, is non-corrosive and slides through slots to enclose and lock the spare tire and accessory compartments.

4 Claims, 15 Drawing Sheets

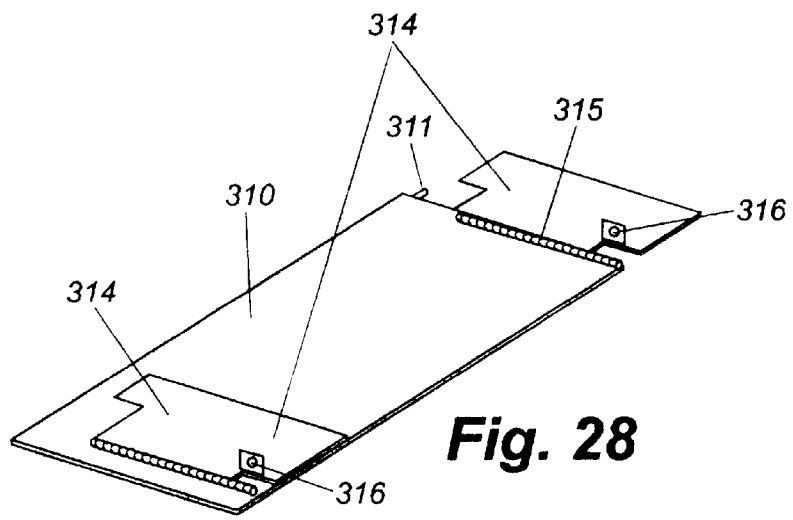
Fig. 28
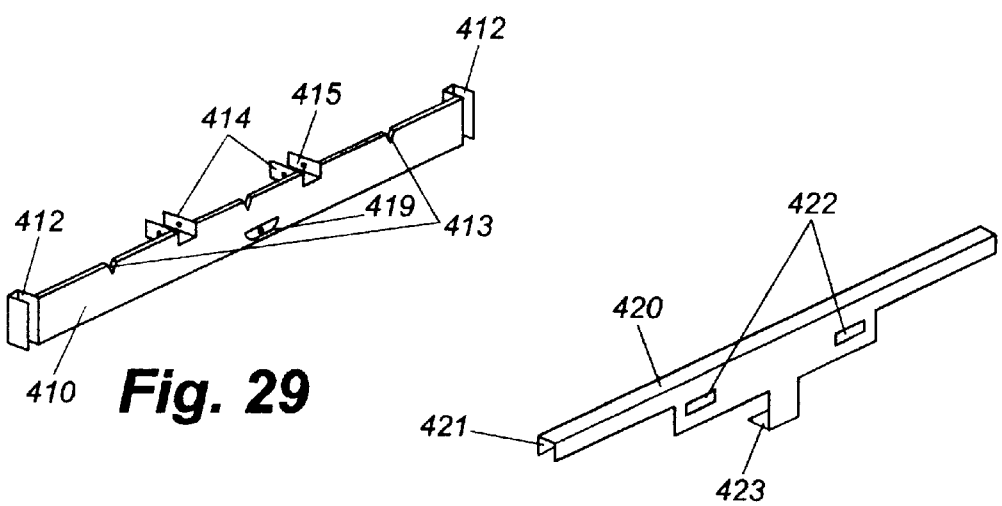
Fig. 29
Fig. 30
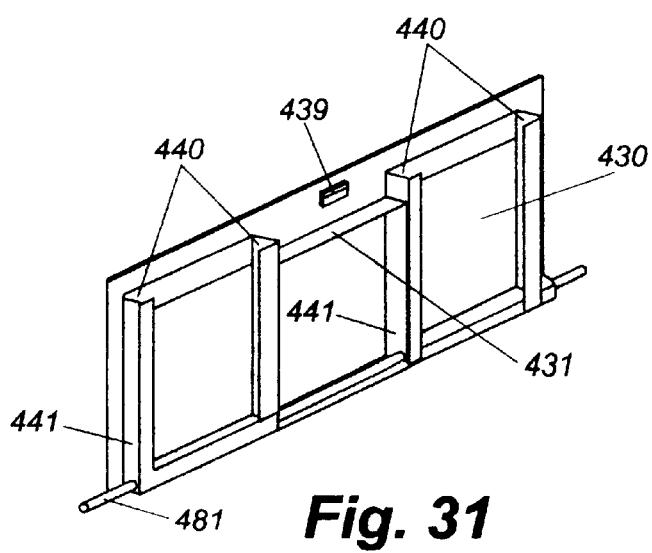
Fig. 31

MULTIFUNCTION TRAILER

CROSS-REFERENCE TO RELATED APPLICATIONS

This is a Continuation of United States Utility Patent Application filed on Nov. 18, 1998 (11-18-1998) under Ser. No. 09/195,009 which is a con't of Ser. No. 08/890,969 filed Jul. 9, 1997, Abn. by Phillip A. DeVore, III entitled MULTIUSE TRAILER, Attorney Docket Number P-271-c.

BACKGROUND OF THE INVENTION

Trailers for automobiles and the like can be subdivided into two major categories; utility trailers and travel/camper trailers.

Conventional utility trailers are of numerous types and their realm of use is generally limited to loading, storing, and hauling various cargo. They are inappropriate for human dwelling purposes.

Flatbed utility trailers provide the ultimate in access to their cargo and are also most versatile in the sizes and shapes of cargo they can accommodate and can tilt down on their axles for loading and unloading (which is unsafe) or can have an overly long tailgate of expanded steel which drops to the ground to serve as a loading ramp. When the tailgate is up and closed in the vertical position, it extends far beyond the side rails. The use of expanded steel for the tailgate component prevents the tailgate from acting as a wind brake while in transit.

Generally, flatbed trailers are inconvenient and of limited reliability when secure weather resistant storage is necessary. If it is necessary to protect the cargo from weather on flatbed trailers, it is usually done by fastening a tarp or canvas covering over the cargo. This is not particularly effective for security purposes or inclement weather; and during towing, the covering and cargo are more susceptible to wind forces.

Enclosed utility trailers or box type trailers provide secure weather resistant storage for cargo, but their fixed enclosure provides limited access to the cargo area. Enclosed utility trailers are somewhat inconvenient when handling certain types of cargo such as dirt, logs, and the like—where a person must be moving in and around the cargo; and where sizes and shapes of cargo exceed the boundaries of the fixed enclosure or the portal to the enclosure.

There is a need for a utility trailer which will more effectively and universally fulfill all of the conventional uses of the flatbed trailer and which can be readily converted to offer a reasonable volume of rigid, fixed, securely enclosed cargo space.

Travel and camper trailers are commercially tied to the field of recreational vehicles (RV), and are used primarily for human dwelling purposes.

A very popular and affordable version of travel/camper trailers is the folding pop-up camper. It is excellent for budget oriented families and ideal for hunting, fishing, and similar outdoor sporting activity.

The folding pop-up camper differs from the rigid, fixed wall travel trailer primarily in that it can be folded down for transit and popped up for camping. Its compactness makes it easy to handle and the relatively flat, low profile when compressed usually enables a boat or other additional camping equipment to be loaded and strapped atop the closed trailer assembly.

Of the numerous sizes and styles of folding pop-up camper trailers, the public generally prefers one which can be opened up to moderate size and will accommodate two (2) to six (6) adults. Adequate sleeping accommodations; ease of erecting and dismantling the flexible enclosure, reasonable counter top and floor apace; and built-in interior structure and equipment are some major considerations in the selection of folding pop-up camper trailers.

A notable typical method in folding pop-up campers is the use of a drawer or platform which may be extended beyond the outer perimeter of the core trailer structure for sleeping quarters. As will be appreciated, this arrangement is a key to providing more living space and interior structure for human comfort and convenience. However, these bunk extensions can be somewhat unstable due to the lateral overhang. There is generally an absence of folding pop-up campers which are also practical for many uses other than camping. When compressed, or battened down for towing, there is negligible cargo space inside and conventional folding pop-up camper trailers are quite inadequate and inappropriate for use as flatbed utility trailers.

Attempts to use conventional folding pop-up camper trailers for utility trailer purposes would likely have significant destructive effects on them.

Conventional travel trailers are fixed walled dwellings on wheels. They generally are not to be converted to other purposes. Attempts at such use would be frustrating to the user and destructive to the apparatus.

Thus, it is important to point out that as utility trailers are generally inappropriate for human dwelling purposes, today's travel/camper trailers cannot be used regularly for much other than camping. Indeed, when one is not camping, the conventional camper trailer sits idle in the yard or driveway; unable to be used as a utility trailer to fulfill many additional home and family needs.

So, whatever the precise merits, features and advantages of prior art, none can serve so many useful purposes as well and efficiently as the present Invention.

SUMMARY

In view of the foregoing, it is an object of the present Invention to provide a method and apparatus for a multiuse trailer which has a wider and more universally effective range of multipurpose utility than previous utility trailers and has the novel ability to easily and readily convert into a comfortable and uniquely functional portable shelter or dwelling.

As will become apparent from the discussion that follows, further advantages of the present Invention are the provision of a method and apparatus that will incorporate an optimum amount of utility and enjoyment into a wholesome piece of equipment that today's homeowners, outdoorsmen, and families can appreciate and that has significant potential for a wide range of uses and high frequency of use.

Another advantage of the present Invention is the provision of a method and apparatus for a multifunctional utility trailer that can serve as a flatbed type trailer which can effectively haul dirt, logs, and the like, as well as rolling cargo such as lawn tractors, riding mowers, and ATV's; or serve as an enclosed box type trailer with an abundance of secure, weather resistant storage space. It will be appreciated that the back cowling panels can be detached and can be used as ramps for loading and unloading rolling cargo or other cargo onto the exposed rear cargo platform. Attaching the back cowling panels to the real sidewalls of the present Invention provides a rigid, water resistant enclosure which can be secured by locking the tailgate.

Yet another advantage of the present Invention is the provision of a method and apparatus for a utility trailer with multiple independent compartments for bulk cargo, tools and equipment, and accessories in separate, well located storage areas which can all be used simultaneously.

Another advantage of the present Invention is the provision of a method and apparatus for a utility trailer that has fittings for a post and rail system which can be erected in multiple configurations for multiple uses and which incorporates a convenient separate locking compartment for storing the components of said rail system beneath the cargo platform.

A further convenient and useful feature advantage of the present Invention is a canopy system which can be attached to the core unit to provide shelter, thus enabling the present Invention to be utilized as a workshop area or as a garage to store a lawn tractor, riding mower, or ATV.

Yet another advantage of the present Invention is the provision of a method and apparatus which by engaging swing out steps, dropping and deploying the front compartment door down for a camper floor, and attaching the canopy system transforms a utility trailer into a unique camper trailer.

An advantage of the present Invention is the provision of a method and apparatus for a camper trailer that has an unconventionally structured interior layout with the bed and service and storage core in the center of the floor plan. This design leads to several other unique characteristics which combine to create simple comfort and efficiency within the living space.

Due to its unconventional arrangement of living space another advantage of the present Invention is the provision of a method and apparatus for a camper trailer wherein retractable steps swing out for easy access, and a deep awning provides comfortable entry into the cabin area having a safe and useful counter top area that can be used for cooking, dining, and writing and which will swing down to create a queen size sleeping platform.

An additional advantage of the present Invention is the provision of a method and apparatus for a camper trailer having a lockable storage compartment, which will store supplies and equipment; and which by opening the tailgate/compartment door, and attaching a vestibule will create an additional queen size bunk area.

The present Invention differs from the referenced prior art in that it is a camper trailer that can be more effectively used for many other purposes besides living quarters.

Thus, another important advantage of the present Invention is the provision of a method and apparatus for a camper trailer which can convert to an open flatbed cargo trailer that can load and haul dirt, logs, lawn tractors, riding mowers, ATV's and the like; and will also serve as an enclosed utility trailer to provide a reasonable volume of secure, weather resistant cargo space.

Yet another advantage of the present Invention is the provision of a method and apparatus for a trailer core unit which in its totality is multipurpose and having individual components which are in and of themselves multifunctional such as the nose cowling which serves as a counter top in the up position and folds down to form a lid over the front compartment, and also to form an elevated sleeping platform and such as the back cowling panels which serve as a rigid cover for the main compartment, a sleeping platform, and can be detached to use as loading ramps and such as the tailcap which serves both as a lockable cover for the spare tire and accessory compartments and as a five (5) foot level and straightedge and such as the rails which can be configured in their fittings for effectively transporting various cargo and can also be used to stabilize the unit for camping or ramp loading and such as the front compartment door which swings down and folds out to become the cabin floor.

A further advantage of the present Invention is the provision of a method and apparatus for maintaining a spartan, low-tech design to facilitate understandability of the Invention, simplify operation, and provide a low malfunction potential but still presenting a quite wide range of utility functions and basic dwelling comfort and convenience.

In accordance with the features of this Invention, a multipurpose trailer comprises a simple durable and reliable core unit with adjustable components and attachments and which has concentrated and compound versatility and functionality.

It can serve optimally as a utility trailer with the ability to fulfill all the cargo loading and hauling requirements of a flatbed trailer and also offers the secure weather resistant cargo capability found in enclosed type utility trailers. It also has additional multifunctional compartments for storing attachments and accessories.

It can be adjusted to serve as a small garage for storing rolling equipment and as a sheltered work station which will store tools, equipment and supplies. And it can also be adjusted to serve as a portable living quarters for two to four adults having an unconventional but functional interior structure which provides simple comfort and efficiency within the living space plus an abundance of security storage space.

Significant features are achieved by the design of subsystems which are themselves multifunctional. Other significant features are achieved by the unique intertwining of subsystems which results in the promotion of complementation and enhancement which is frequently a symbiotic nature.

BRIEF DESCRIPTION OF THE DRAWINGS

The foregoing and other and further objects, features, and advantages of the Invention will be indicated in the appended Claims or will be apparent upon an understanding of the following more particular description of preferred embodiments as illustrated in the accompanying drawings; an Index of Reference Characters as well as an Index of Part Names immediately follow this Brief Description list of Figures. The drawings are not necessarily to scale, emphasis instead being placed upon illustrating the principles of the Invention. Moreover, various objects, features, and advantages of the Invention not referred to herein will occur to one skilled in the art upon employment of the Invention in practice.

FIG. 28 is a right front perspective view of the front wall/camper floor component of the first preferred embodiment of the trailer of FIG. 2.

FIG. 29 is a left rear perspective view of the tailbar component of the first preferred embodiment of the trailer of FIG. 3.

FIG. 30 is a left rear perspective view of the tailcap component of the first preferred embodiment of the trailer of FIG. 3.

FIG. 31 is a left rear perspective view of the tailgate component of the first preferred embodiment of the trailer of FIG. 3.

Figure 1:
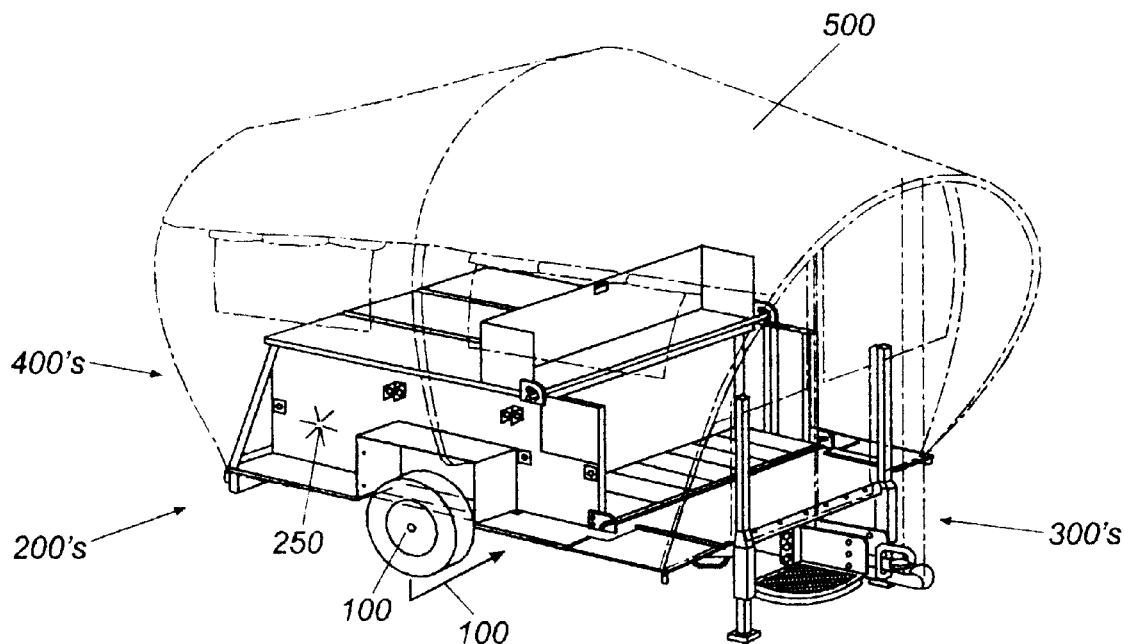
FIG. 1 is a right front perspective superimposed composite view of a first preferred embodiment of a trailer, comprising a frame, a skeletal assembly, a neck assembly, back cowling, sidewalls, fenders, fender braces, a tailgate, a nose cowling (including a hinge/gutter), steps, a divider panel, a front door (including flaps), floor braces, a rear compartment, a canopy system, canopy struts, windowalls, a bunk vestibule (including canvas flaps and a mosquito net), a post and rail system, levelers, a tailcap, a tongue, a tailbar, and a wheel and axle assembly.

An Index of Reference Characters as well as an Index of Part Names follow:

BRIEF DESCRIPTION OF THE DRAWINGS
INDEX sorted by REFERENCE NUMBERS
NUMBER NAME sorted by REFERENCE NUMBERS
  100 Wheel and Axle assembly
  205 Hole for cotter pin
  206 Pegs
  210 Frame main
  211 Frame grip
  212 Frame appendages
  213 Hole for cotter pin
  214 Lock, Cotter pin
  215 Parking posts
  216 Boot
  217 Hinge
  218 Brace, Floor, swing-out
  220 Skeleton assembly
  221 Skeleton channel holes
  240 Fender assembly
  241 Fender brace, Triangular
  245 Divider panel 250 Side wall
260 Cowling panels, Back
261a Perimeter shapes (a)
261b Perimeter shapes (b)
262 Hole in cowling panels
263 Hole in cowling panels
264 Rib
265 Gutter system
270 Compartment
271 Slots, accessory compartme
280 Spare tire compartment
290 Hinge plate slot, tailgate
295 Cleats
296 Hole for cotter pin
297 Hole for bolt
298 Web clip
299 Post, hole
301 Neck
302 Neck Assembly Slot
303 Hinge plate
304 Hinge plate slot, cowling
305 Hinge rod
306 Nose cowling
307 Locking tab, cowling
308 Work surface
310 Front wall / Floor (Deck)
311 Hinge rod
312 Hinge plate
313 Hinge plate slot, front
314 Extension flap
315 Piano hinge operation
316 Locking flaps
320 Tongue
321 Tongue grips
330 Step assembly, Deck
333 Step runners
334 Hole in step runner
335 Expanded steel surface.
336 Hole in step component
337 Tube
339 Hole in frame tubes
340 Decking area
410 Tailbar
412 End channels
413 Tailbar Slots
414 Tailbar Channels
415 Hole for cotter pin
419 Locking tab, tailbar
420 Tailcap
421 Profile
422 Level bulbs
423 Flange
430 Tailgate/Compartment, Rear
431 Handle Bar
432 Cable Hole, Fender Brace
433 Cables
439 Slot, tailgate
440 Tailgate Channels
441 Hole for cotter pin
481 Hinge rod
490 Taillight assembly
500 Canopy, Primary/Cord
521 Fabric heat, rainshield
522 Roof strut sleeves
523 Net Openings
524 Windows
525 Closure
526 Zipper Fasteners
530 Windowall front entry
531 Zipper Fasteners
538 Net Windows
539 Fasteners
540 Windowall rear
545 Fabric
546 Windowall rear straps
547 Net
548 Net Flaps
590 Receptacle tube
595 Canopy struts
601 Cotter pin
602 Hole for clevis pins
603 Clevis pin
604 Bolts
604 Bolts
605 Heavy bolts
610 Post
611 Hole for cotter pin
620 Post or rail
621 Hole for cotter pin
900 Camper

BRIEF DESCRIPTION OF THE DRAWINGS
INDEX sorted by PART NAMES
NUMBER NAME sorted by NAME
604 Bolts
604 Bolts
216 Boot
218 Brace, Floor, swing-out
432 Cable Hole, Fender Brace
433 Cables
900 Camper
595 Canopy struts
500 Canopy, Primary/Cord
295 Cleats
603 Clevis pin
525 Closure
270 Compartment
601 Cotter pin
260 Cowling panels, Back
340 Decking area
245 Divider panel
412 End channels 335 Expanded steel surface.
314 Extension flap
545 Fabric
521 Fabric heat, rainshield
539 Fasteners
240 Fender assembly
241 Fender brace, Triangular
423 Flange
212 Frame appendages
211 Frame grip
210 Frame main
310 Front wall/Floor (Deck)
265 Gutter system
431 Handle Bar
605 Heavy bolts
217 Hinge
303 Hinge plate
312 Hinge plate
304 Hinge plate slot, cowling
313 Hinge plate slot, front
290 Hinge plate slot, tailgate
305 Hinge rod
311 Hinge rod
481 Hinge rod
297 Hole for bolt
602 Hole for clevis pins
205 Hole for cotter pin
213 Hole for cotter pin
296 Hole for cotter pin
415 Hole for cotter pin
441 Hole for cotter pin
611 Hole for cotter pin
621 Hole for cotter pin
262 Hole in cowling panels
263 Hole in cowling panels
339 Hole in frame tubes
336 Hole in step component
334 Hole in step runner
422 Level bulbs
214 Lock, Cotter pin
316 Locking flaps
307 Locking tab, cowling
419 Locking tab, tailbar
301 Neck
302 Neck Assembly Slot
547 Net
548 Net Flaps
523 Net Openings
538 Net Windows
306 Nose cowling
215 Parking posts
206 Pegs
261a Perimeter shapes (a)
261b Perimeter shapes (b)
315 Piano hinge operation
610 Post 620 Post or rail
299 Post, hole
421 Profile
590 Receptacle tube
264 Rib
522 Roof strut sleeves
250 Side wall
220 Skeleton assembly
221 Skeleton channel holes
439 Slot, tailgate
271 Slots, accessory compartme
280 Spare tire compartment
330 Step assembly, Deck
333 Step runners
333 Step runners
410 Tailbar
414 Tailbar Channels
413 Tailbar Slots
420 Tailcap
430 Tailgate/Compartment, Rear
440 Tailgate Channels
490 Taillight assembly
490 Taillight assembly
320 Tongue
321 Tongue grips
337 Tube
298 Web clip
100 Wheel and Axle assembly
530 Windowall front entry
540 Windowall rear
546 Windowall rear straps
524 Windows
308 Work surface
526 Zipper Fasteners
531 Zipper Fasteners

DETAILED DESCRIPTION OF THE DRAWINGS

The trailer of FIG. 1 comprises a core unit 100, permanently attached to a standard single axle and wheel assembly 200 rendering the trailer suitable for being towed by a motor vehicle. Also, as is shown in FIG. 1, a complete canopy system 300, can be attached to the adjusted core unit for a variety of valuable uses. These and other elements will be described in the drawings that follow.

Figure 2:
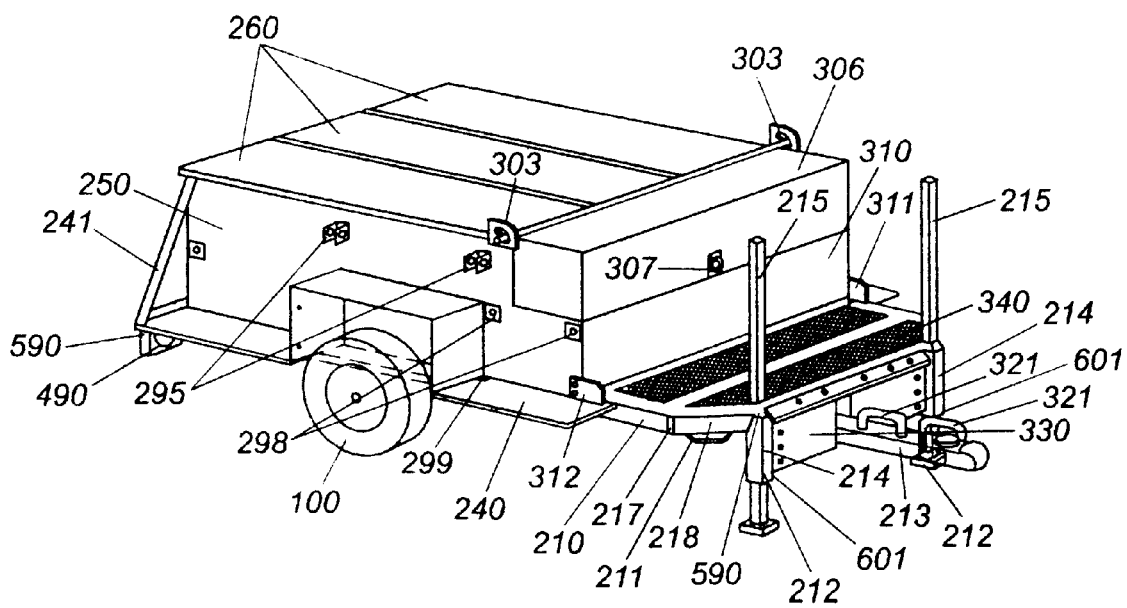
FIG. 2 is a right frontal perspective view of the core unit of the first preferred embodiment of the trailer of FIG. 1, fully closed.

Referring to FIG. 2, the tongue grips 321 are ergonomically designed for comfort and safety in handling, an especially appreciated feature when hitching and unhitching. The steps 330, are locked in the closed position to be out of the way when not in use, and are locked in position with cotter pins 601. If it is desired to engage the steps for use, there is a corresponding hole 213 in the tongue for a cotter pin to lock the steps in the open position. When it is time to unhitch and park, two posts 215 slide through parking sleeve appendages 212 which are integrally welded to the frame. By gripping the frame grip 211 which is integrally welded to the frame, the entire apparatus can be balanced while cotter pins 214 are inserted to lock the parking posts into position. It must be noted that in lieu of parking sleeves and parking posts, parking and leveling functions could be well achieved by attaching various optional premanufactured devices which are used for this purpose.

A swing-out floor brace 218 of the same composition as the frame assembly 210 is permanently attached to the frame assembly through the use of a heavy knuckle hinge 08 at the connection. At the opposite end of the floor brace from the hinge is an integral receptacle tube 06. As further drawings will reveal, when the apparatus is converted to a camper the extended floor flaps will be supported by this brace and the receptacle tube will serve as an anchor point for canopy struts.

The front wall/floor assembly 310 is in the vertical position, and the nose cowling 306 is down, overlapping the front wall/floor assembly to enclose the front compartment space.

The back cowling panels 260 are attached to the core unit and along with the sidewalls 250 serve to create a large rear enclosure.

The sidewalls are comprised of tough and corrosion resistant material such as fiberglas composition sheet, aluminum, or coated steel.

The fender brace 241, welded to the frame and skeleton assembly provides strength and rigidity to the core unit. And the fender assembly 240 is permanently attached to the core unit serving as mud guard when in transit, and a catwalk when in the camper mode. Additional cargo can be strapped atop the fender assembly through web clips 298.

Also welded to the fender brace 241 are a receptacle tube 590 for anchoring canopy struts, and a taillight assembly 490.

Cleats 295 are permanently attached through the sidewall 250 and to the frame and skeleton.

Hinge plates 303 allow the nose cowling to swing up and down for different uses and hinge plates 312 allow the front wall/floor assembly 310 to swing up and down for different uses. The hinge rod 311 welded to the front wall/floor assembly traverses within the confines of the slot in the hinge plate 312.

The front deck area 340 is composed of expanded steel welded to the frame 210. This is light weight and allows mud and dirt to fall through to the ground. The core unit is permanently mounted on a standard single axle and wheel assembly 100.

Figure 3:
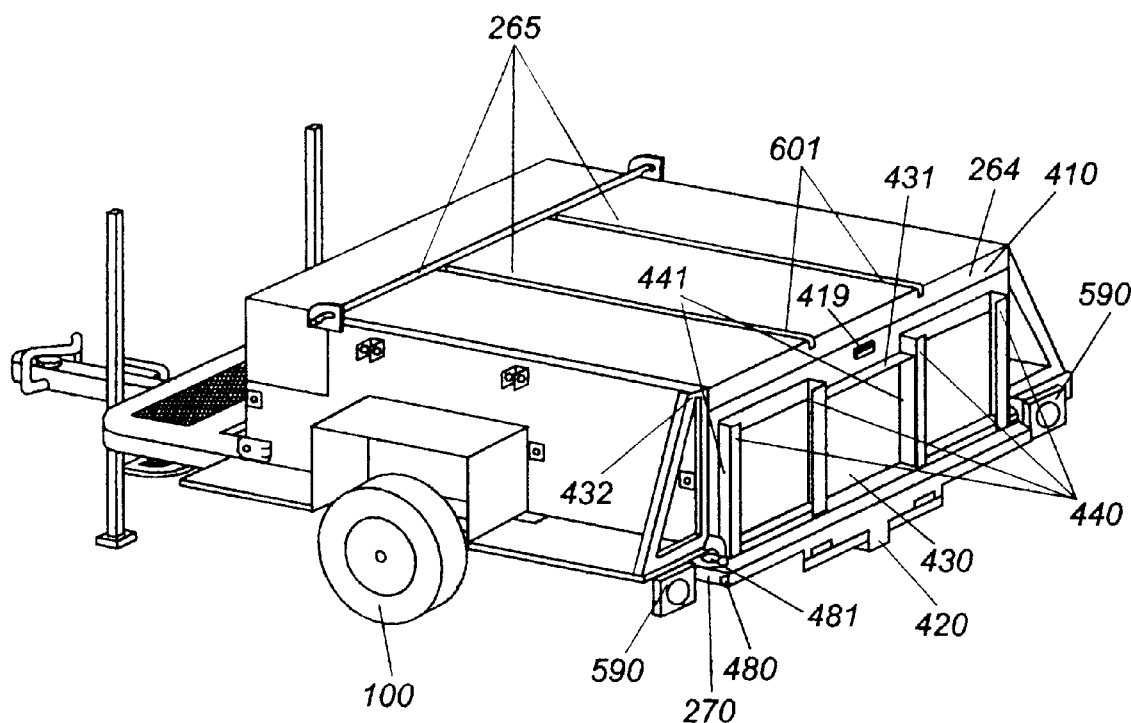
FIG. 3 is a left rear perspective view of the core unit of the first preferred embodiment of the trailer of FIG. 1, fully closed.

The rear perspective of FIG. 3 highlights the gutter system 265 which diverts and channels water off of the unit. This system is naturally formed by the shapes of the neck assembly, tailbar, and back cowling when in the enclosed position as shown.

Cotter pins 601 fastened through holes in the back cowling and tailbar 410, lock the back cowling into position. As a security feature, these cotter pins can only be reached by opening the tailgate 430.

A locking tab 419 is welded to the tailbar 410 and passes through a slot in the tailgate 430. The tailgate can be locked closed by inserting a cotter pin or padlock through the locking tab.

The rib structure 264 of the back cowling strengthens and stiffens the back cowling for use as ramps and also forces a tight fit into the slots in the tailbar 410.

Receptacle tubes 590 are welded to the frame for anchoring canopy struts and a hole 432 in the fender brace serves to fasten a cable or chain to hold the tailgate open in the horizontal position. This elongates the rear compartment bed.

Channels 440 welded to the tailgate accommodate back cowling panels which will then serve as loading ramps. These channels also stiffen and strengthen the tailgate. Further drawings will show the loading ramps in use.

Holes 441 in the channels are for cotter pins which will lock the cowling/ramps safely into position. A cylindrical handle bar 431 is also a part of the tailgate structure.

The hinge rod 481 welded to the tailgate traverses within the confines of the slot in the hinge plate 011 to open and close the tailgate.

A removable tailcap 420 which serves as a lockable cover for the spare tire and accessory compartments also serves as a 5 foot straightedge.

Figure 4:
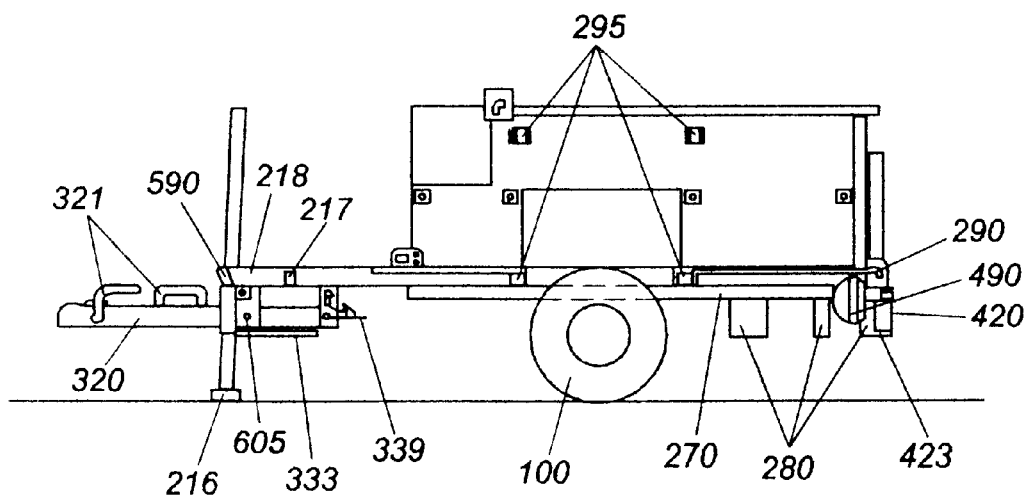
FIG. 4 is an left elevational view of the core unit of the first preferred embodiment of the trailer of FIG. 1, fully closed.

The elevational view of FIG. 4 further reveals how the tongue 320 can be set in multiple height positions when attached with heavy bolts 605 through holes 339 in the frame.

FIG. 4 shows side views of the tongue grips 321, which are ergonomically designed for comfort, safety and maneuverability. Also shown are the swing-out floor brace 218 with its integral receptacle tube 02 and heavy knuckle hinge 217.

The slot 410 in the hinge plate keeps the tailgate nested in the closed position. The removable tailcap 420 is shown positioned in the slots cut in the end of the accessory compartment 270 which is welded to the frame.

The spare tire compartment 280 is welded to the frame and has a flange 423 which overlaps with the flange on the tailcap 420. By inserting a cotter pin or padlock through corresponding holes in these flanges, the spare tire and accessory compartments can be locked securely.

The taillight assembly 490 is shown attached to the frame and fender assembly.

Cleats 295 are permanently bolted to the frame for fastening posts in various positions with cotter pins.

The swing out steps slide atop and rest upon step runners 333 and a boot 216 fits snugly over the end of a post and acts as a foot pad.

In the configuration of FIGS. 2, 3, and 4, the trailer will provide weather resistant, locked secure storage in two separate main compartments, and will carry additional cargo atop the fenders, back surface, and exposed deck area.

Figure 5:
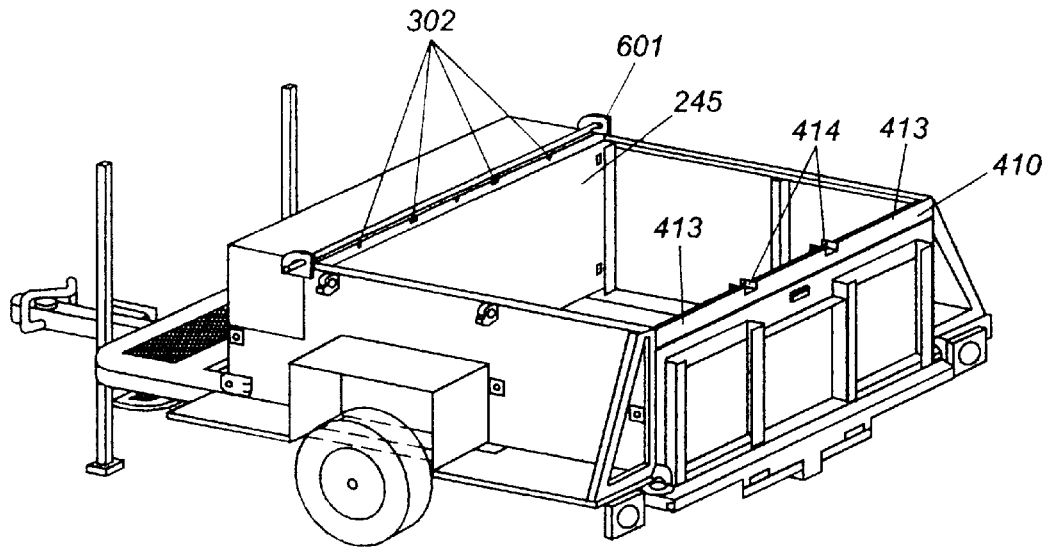
FIG. 5 is a left rear perspective view of FIG. 3, back cowling detached, tailgate up.

In FIG. 5, the back cowling panels have been removed, the tailbar 410 is still in place and the tailgate is closed (up). A sizeable load of dirt, gravel, logs, or other items and objects can be carried in the rear compartment area and the front compartment is still available for secure storage.

Slots in the neck assembly 302 and slots 413 and channels 414 in the tailbar 410 will serve to force a tight fit with the back cowling panels in place. The channels 414 integrally welded to the tailbar 410 enable the back cowling panels to be securely locked with cotter pins.

A removable divider panel 245 is held in position against the framing of the unit with cotter pins 601.

Figure 6:
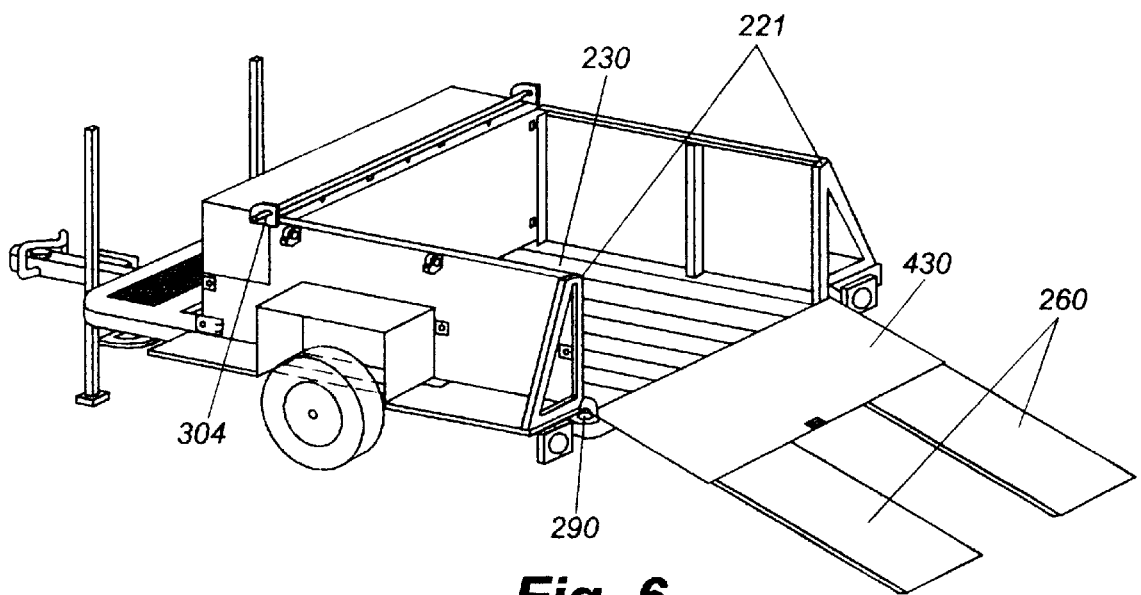
FIG. 6 is a left rear perspective view of a first preferred embodiment of the trailer of FIG. 5, tailbar removed, tailgate down, ramps engaged.

In FIG. 6 the back cowling panels 260 have been inserted in the tailgate 430 for use as ramps. Note that the tailbar has been removed.

The cargo deck 230 is preferably composed of pressure treated plank, bolted to the frame; however other materials could be practical as well.

Holes in the skeleton channels 221 provide for the tailbar to be attached and removed with cotter pins.

Slot 290 in hinge plate keeps the tailgate nested in the ramp position and slot 304 in the hinge plate keeps the nose cowling nested in the closed position.

Figure 7:
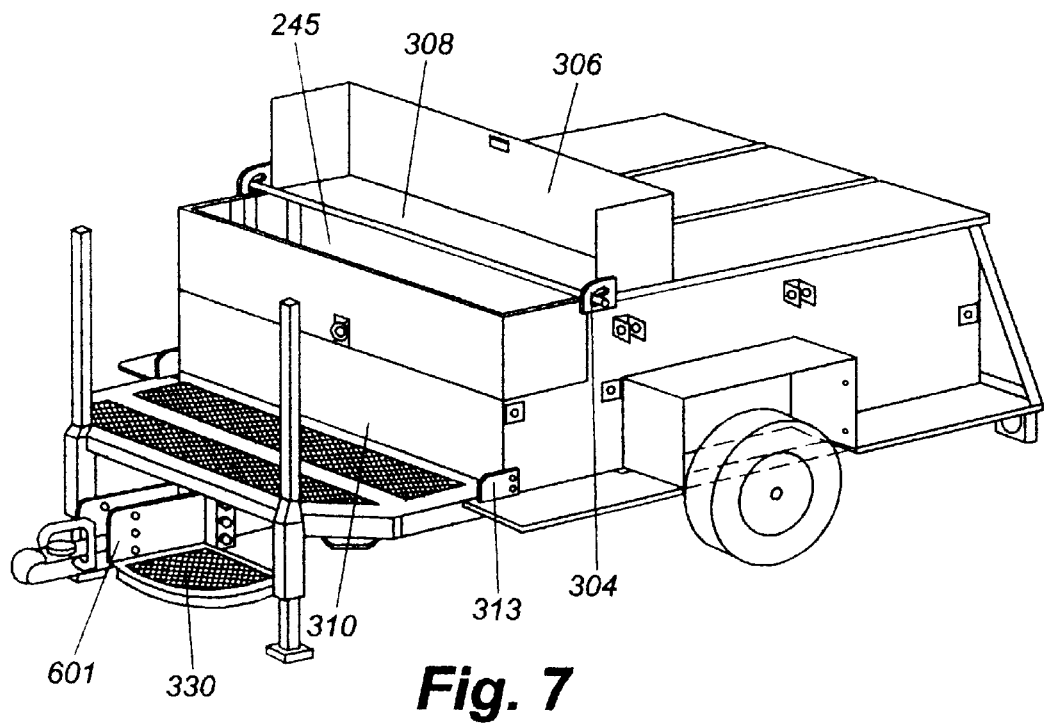
FIG. 7 is a left frontal perspective view of the first preferred embodiment of the trailer of FIG. 2, rear compartment closed, nose cowling raised, steps engaged.

In FIG. 7 the steps 330 are locked in the activated position for easy access to the front deck area. The nose cowling 306 which is made of aluminum in order to be corrosion and flame resistant is up (open) and forms protected work surface 308 behind the open front compartment.

The front wall/camper floor 310 is up (closed) to create the front compartment. And the divider panel 245 separates the front and rear compartments.

A cotter pin 601 locks swing out step 330 in activated position against the tongue.

The slot 313 in the hinge plate keeps the front wall nested in the closed position.

The slot 304 in the hinge plate keeps the nose cowling nested in the open position.

Figure 8:
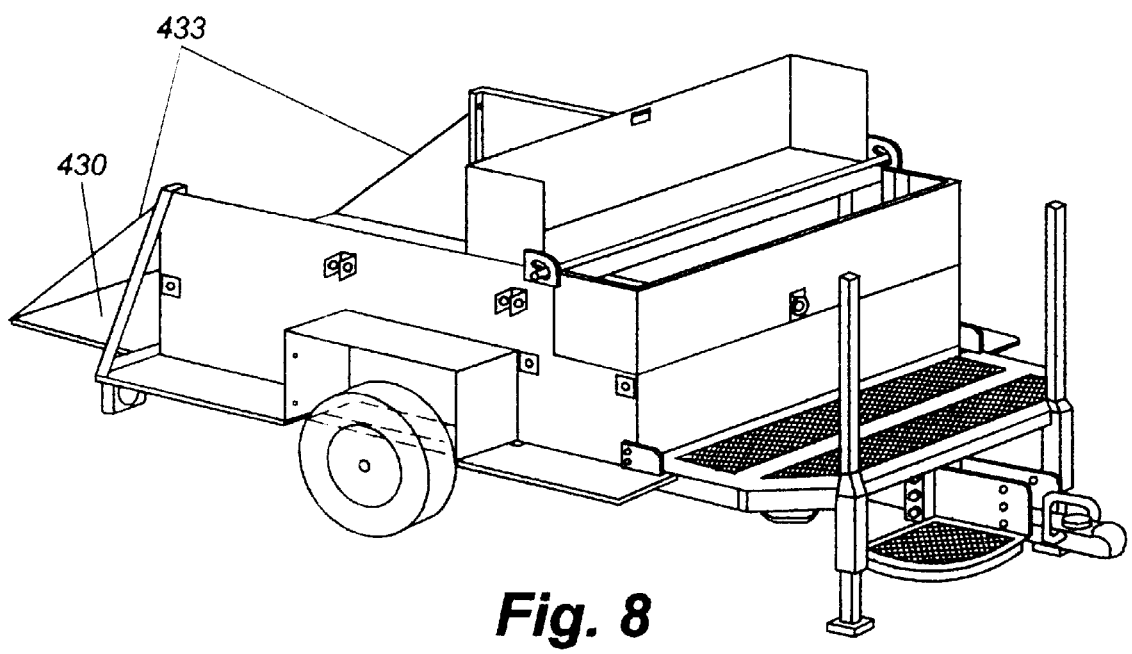
FIG. 8 is a right frontal perspective view of the first preferred embodiment of the trailer of FIG. 7, tailgate horizontal, nose cowling up, steps activated, back cowling and tailbar removed.

In FIG. 8 the back cowling panels and tailbar have been removed and the tailgate 430 is held in the horizontal position. This elongates the rear deck area for more cargo space. Cables 433 or chains hold the tailgate in position.

Figure 9:
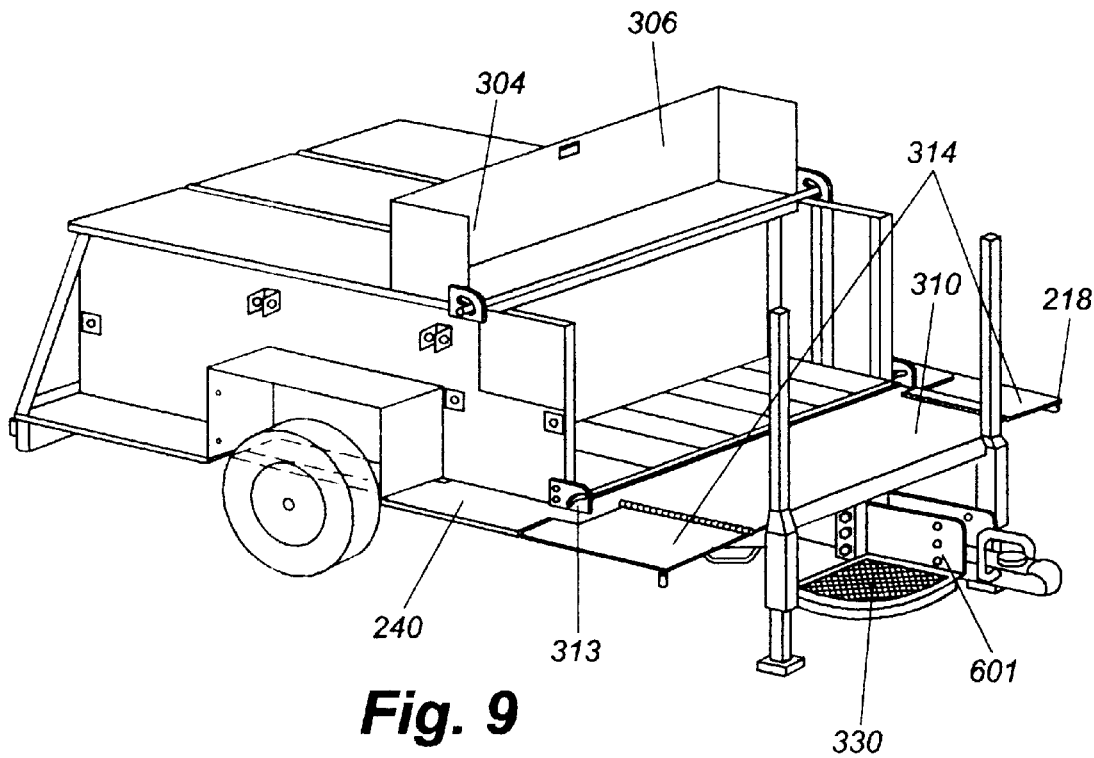
FIG. 9 is a right frontal perspective view of the first preferred embodiment of the trailer of FIG. 2, front door down, flaps extended, nose cowling raised, rear compartment closed, steps engaged.

FIG. 9 represents the configuration intended for the camper mode.

This reveals what comprises the unconventional yet practical interior structure of the cabin.

The front wall/camper floor 310 is open (down) with flaps 314 extended to create an expanded front deck floor space. The extension flaps rest on swing out braces 218.

The swing out step assembly 330 is locked in the open activated position against the tongue with a cotter pin 601.

The slot 313 in the hinge plate keeps the floor nested in position.

A catwalk to the rear of the cabin is formed by the fender assembly 240.

The nose cowling 306 is up. This provides more floor space in the front deck area and serves as a spacious counter top with back and side guards. This shielded counter top is functional whether the user is sitting or standing. The metal back and side guards of the nose cowling are flame and wind resistant, thus safer for cooking and the like. The slot 304 in the hinge plate keeps the nose cowling 306 nested in the open position and allows the nose cowling to swing down (closed). The surface area thus formed by the back cowling panels and the closed nose cowling can be used as a sleeping platform for two (2) adults.

Figure 10:
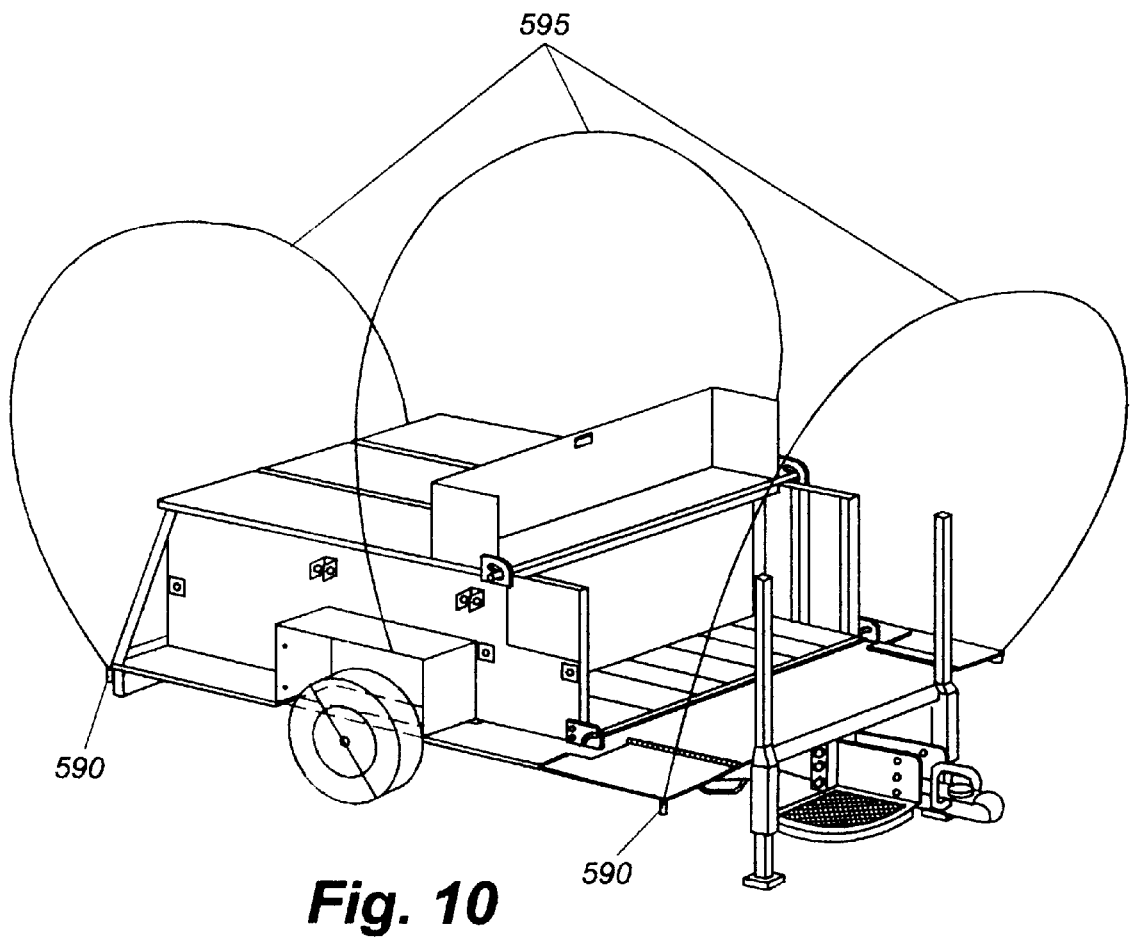
FIG. 10 is a right frontal perspective view of the first preferred embodiment of the trailer of FIG. 9, roof struts in place without canopy.

In FIG. 10, flexible canopy struts 595 are assembled end to end to their full length, pushed through sleeves in the tent canopy, and their ends are inserted in the receptacles 590. This forms a rib structure to support the canopy.

Figure 11:
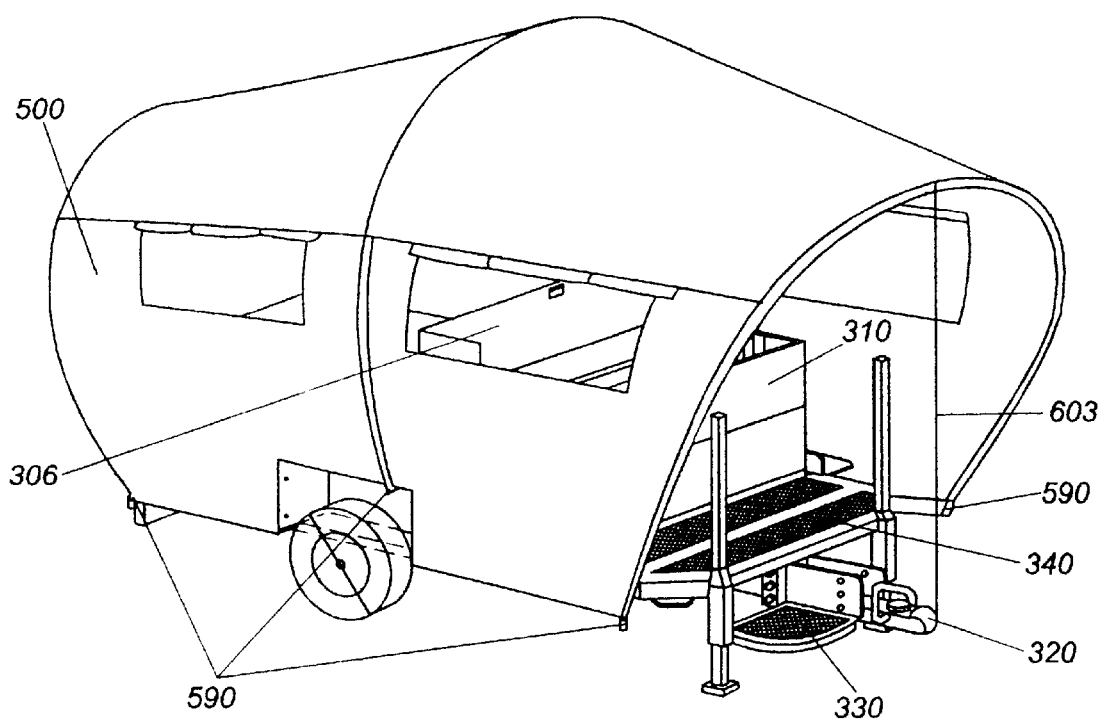
FIG. 11 is a right frontal perspective view of the first preferred embodiment of the trailer of FIG. 7, with primary canopy, steps engaged.

In FIG. 11, the primary canopy 500 is erected and attached to the core unit thereby forming a weather resistant work port. The canopy struts have been inserted through sleeves in the canopy and into the receptacle tubes 590. Fastening a cord 603 from the apex of the canopy to the end of the tongue 320 provides steady tension necessary to stretch and maintain the canopy taught and rigid and draws the canopy forward to serve as an awning. This configuration is very convenient and functional for all kinds of outdoor work projects. The steps 330 are locked to the tongue 320 with a cotter pin, thereby providing comfortable access to the deck area 340. The expanded steel construction of the steps 330 and deck 340 allows mud, dirt, and debris to fall through to the ground. The front wall 310, being fixed in the closed position forms a front compartment. By raising the nose cowling 06 the front compartment is accessible. Also, the raised nose cowling serves as a shielded counter top which is ideal for spreading out paperwork, parts or refreshments.

Figure 12:
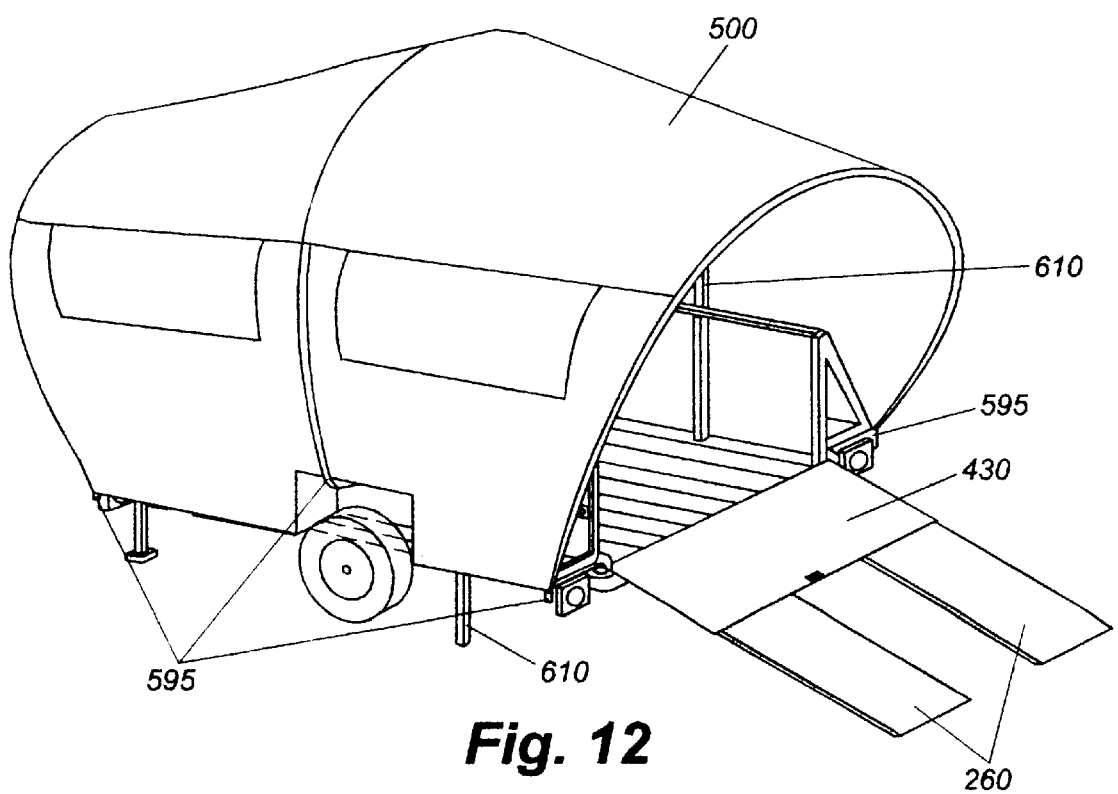
FIG. 12 is a left rear perspective view of the first preferred embodiment of the trailer of FIG. 6, with canopy, ramps engaged.

The rear perspective of FIG. 12 shows how the present Invention can be utilized for a weather resistant port for various rolling equipment such as ATV's, lawn tractors, riding mowers, etc. The primary canopy 500 is in position.

Back cowling panels 260 have been inserted into the lowered tailgate 430 and serve as a loading ramp. It is easy to add stability to the unit for safe loading of heavy equipment by fastening posts 03 into the cleats on the side of the core unit.

Figure 13:
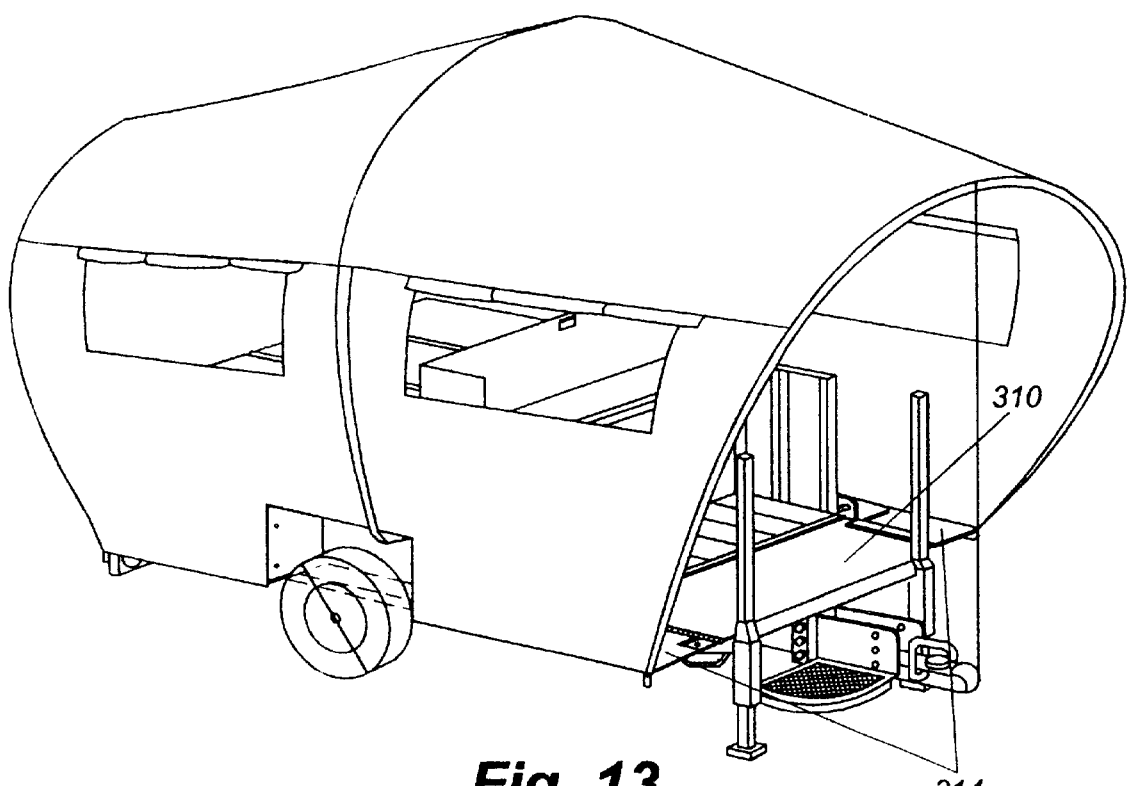
FIG. 13 is a right frontal perspective view of the first preferred embodiment of the trailer of FIG. 11, front door down, flaps extended, without front entry window wall.

FIG. 13 shows an intermediate configuration and depicts the front wall 310 down and floor extension flaps 314 extended and resting on swing out braces. It can be seen in FIG. 13 how the front deck floor space has been enlarged for use as living space.

Figure 14:
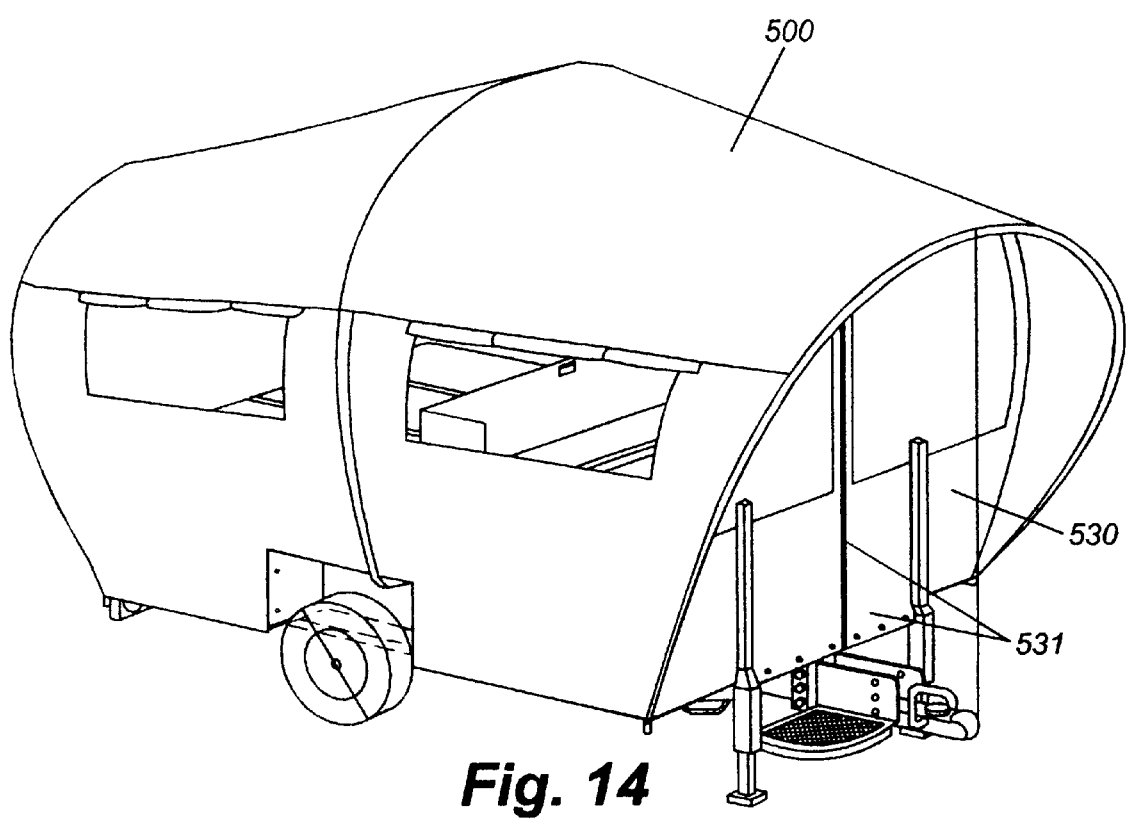
FIG. 14 is a right frontal perspective view of the first preferred embodiment of the trailer of FIG. 13, front entry window wall attached.

In the expedition camper configuration as shown in FIG. 14 the primary canopy 500 is in place, and the zip-in front entry windowall assembly 530 has been attached. This allows exit and entry and can be zipped and snapped shut.

Figure 15:
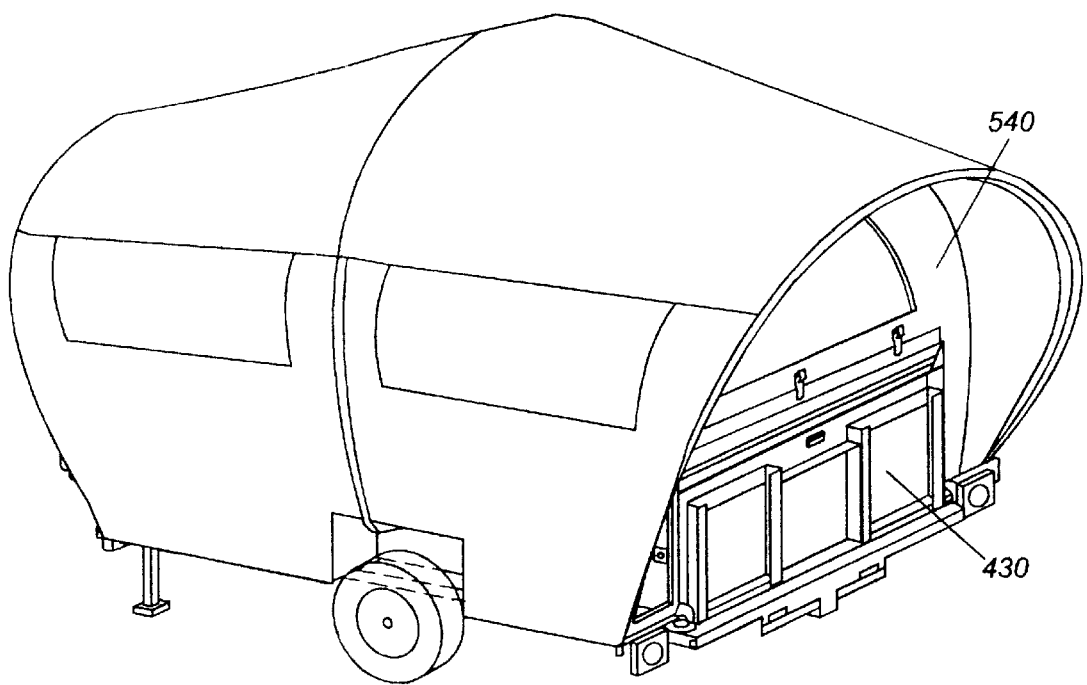
FIG. 15 is a left rear perspective view of the first preferred embodiment of the trailer of FIG. 14 with rear windowall attached.

The rear perspective of FIG. 15 shows the rear windowall 540 zipped into place and the tailgate 430 is closed, providing abundant secure storage capacity in the rear compartment.

Figure 16:
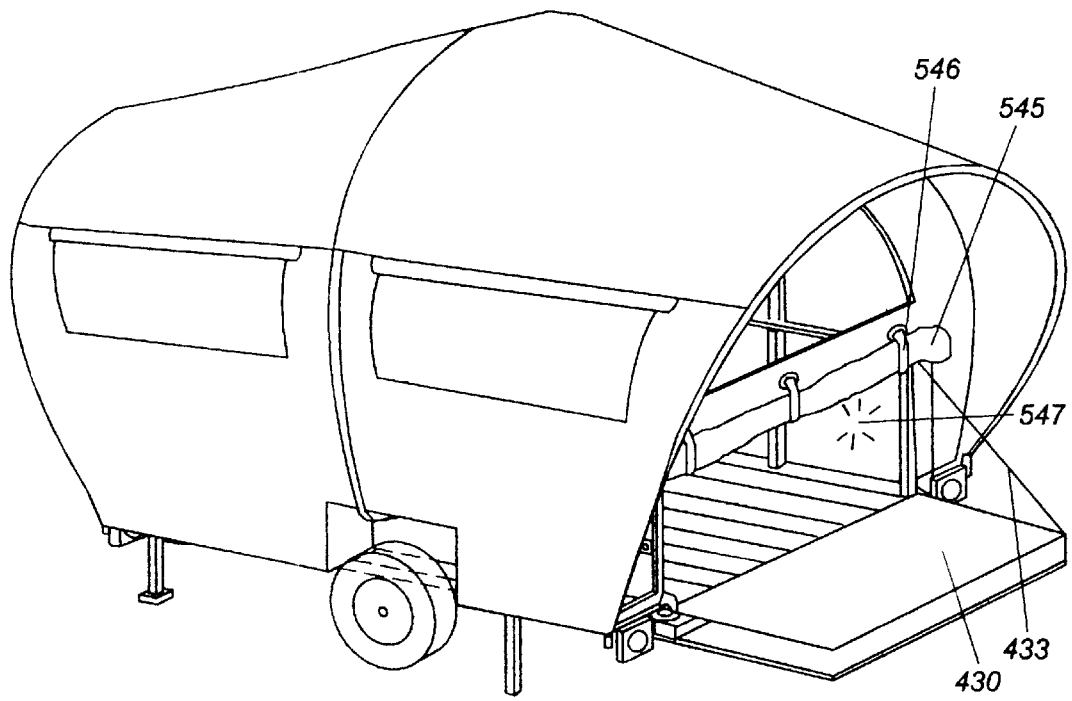
FIG. 16 is a left rear perspective view of the first preferred embodiment of the trailer of FIG. 15, tailgate horizontal, bunk vestibule attached, canvas up, mosquito net down.

In the expedition camper mode, additional bunk space for two people can be created by opening the tailgate to a horizontal position and attaching a bunk vestibule. This is shown in FIG. 16 where the tailgate 430 is held open in horizontal position by cables 433. The bunk vestibule is attached with mosquito net 547 deployed and as shown a fabric rainshield 545 is rolled up and held by straps 546 on the rear windowall. The mosquito net drapes over the three extended edges of the tailgate 01, thereby encapsulating the bunk space. This configuration is good for sleeping "under the stars."

Figure 17:
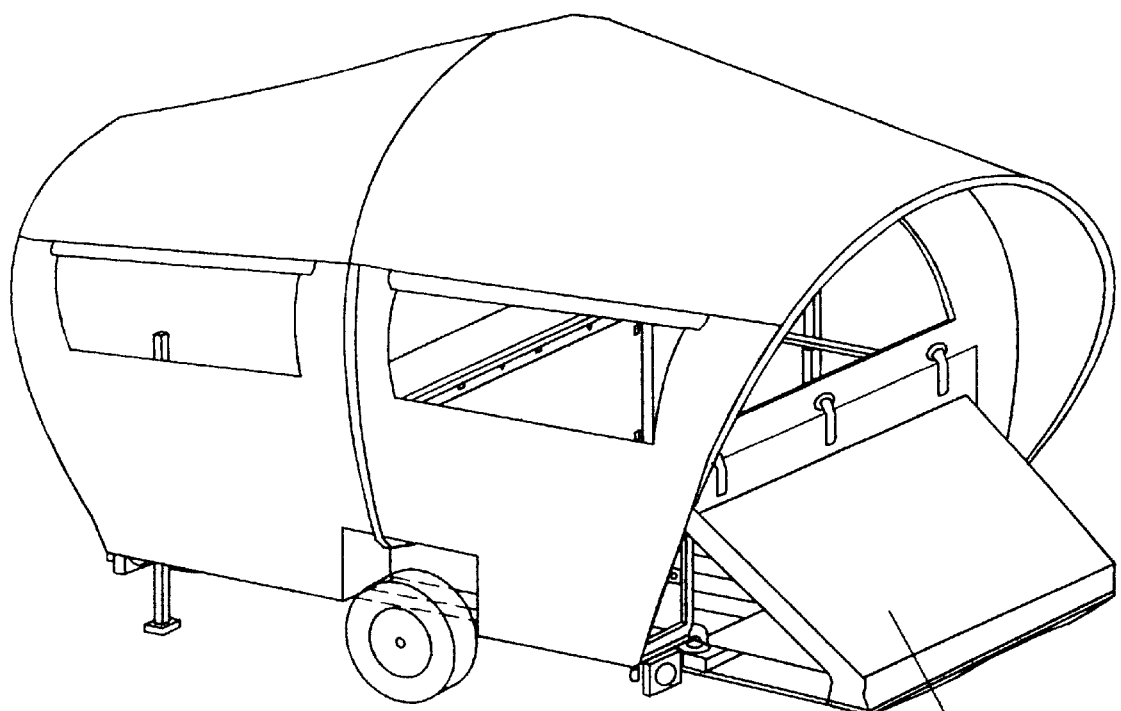
FIG. 17 is a left rear perspective view of the first preferred embodiment of the trailer of FIG. 16, bunk vestibule attached, canvas extended.

For inclement weather, FIG. 17 shows the fabric rainshield 545 deployed on the bunk vestibule. It can be noted that the rainshield does not cover the sides of the tailgate and this provides for ample ventilation.

Figure 18:
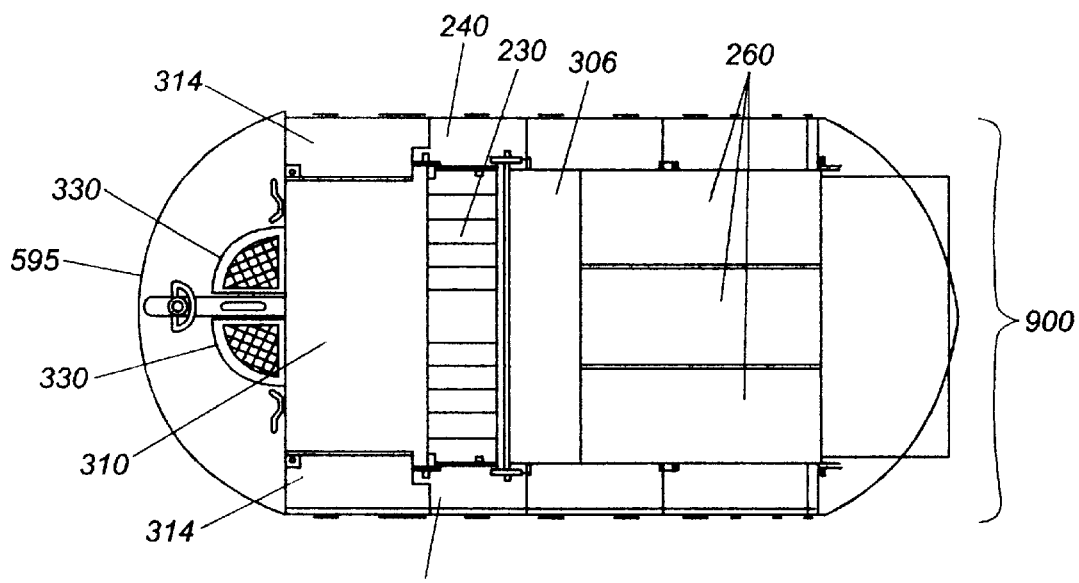
FIG. 18 is a plan view of the first preferred embodiment of the trailer of FIG. 10.

FIG. 18, a floor plan view, further clarifies the unique interior structure of the present Invention in the expedition camper configuration. It can be seen how the front canopy strut assembly 02 extends over and beyond the activated front steps 330 providing an awning over the entry way. The front wall/camper floor 310 is down and the floor flaps 04 are extended. As shown, not only do the extended floor flaps rest on the swing-out braces, but they overlap and are supported by the fender assembly 240. The fender assembly forms a catwalk on each side of the core unit, but still inside of the enclosed living space. This assures total comfortable access to all points in the interior.

With the nose cowling 306 raised a shielded counter top area is created and additional floor space 230 becomes available.

The back cowling panels 260 form a rear platform area and when the nose cowling 306 is swung shut, the platform is extended and can be used for a sleeping platform for two adults.

Figure 19:
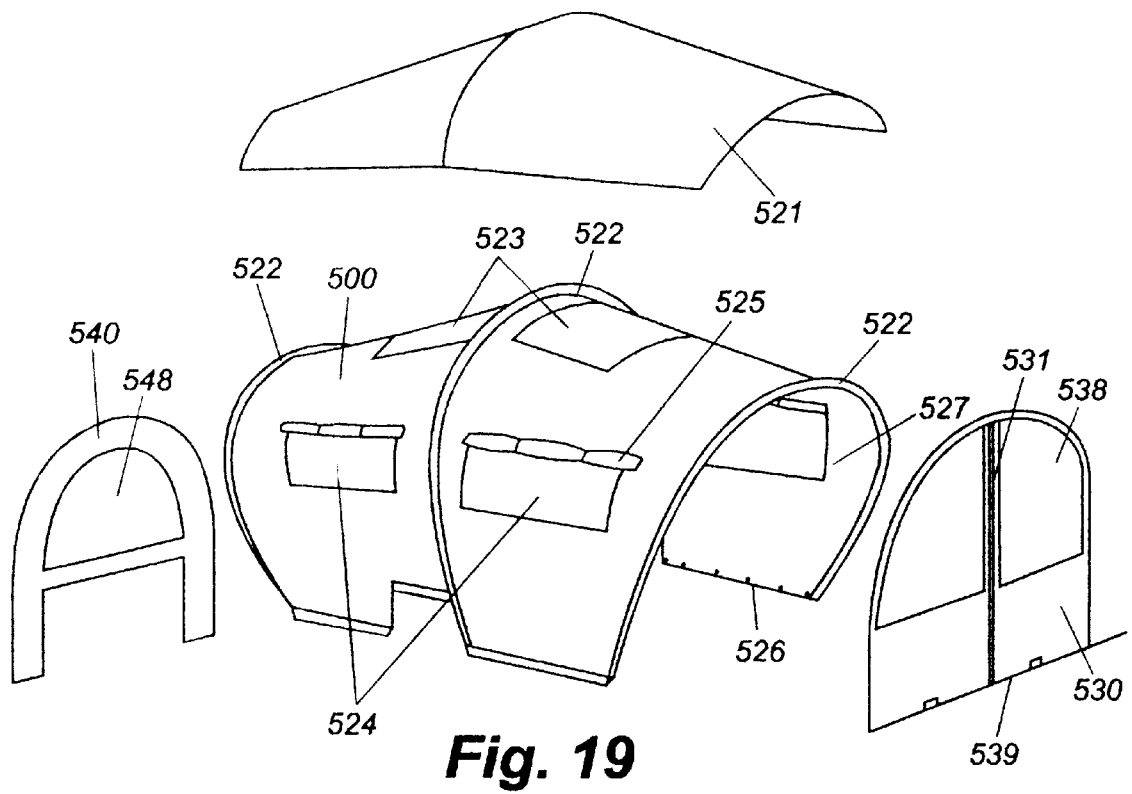
FIG. 19 is a right frontal perspective exploded view of the various components of the canopy system of the first preferred embodiment of the trailer of FIG. 14 and FIG. 15.

FIG. 19 shows an exploded perspective view of various components of the canopy system. It is important to note that the canopy system could take on various shapes and designs that could fit to the core unit and still function as a comfortable habitat, providing ventilation, protection from sun, rain, and insects.

A moisture impervious heat and rainshield component 521 is permanently stitched to the primary canopy 500 at the top of the canopy strut sleeves 522. This creates a covered ventilation space for vapor and smoke to escape the interior cabin area through mosquito net openings 523. The mosquito net openings 523 are stitched to the ceiling of the primary canopy and will also have a method for zip-in closures on the inside.

Other windows 524 have mosquito net, plus a roll-down or zip-down closure 06 either on the inside or the outside.

For attachment to the core unit, fasteners 526 are provided at all perimeter points of the canopy system.

A full zipper 527 in the front and rear openings of the primary canopy is for attaching the front and rear windowalls. The front entry windowall 530 zips into the primary canopy and fastens to the core unit with fasteners 539. A zipper 531 opens and closes the leaves of the front windowall for entry and exit.

Stitched-in mosquito net windows 538 have zip-in closure flaps on the inside.

The rear windowall 540 also zips into the primary canopy and fastens to the core unit and it has mosquito net window 548 stitched in place plus zip in closure flaps.

The entire canopy system can be folded compactly and packed into a duffel bag which could be stored in a small space of the front compartment of the core unit.

Figure 20:
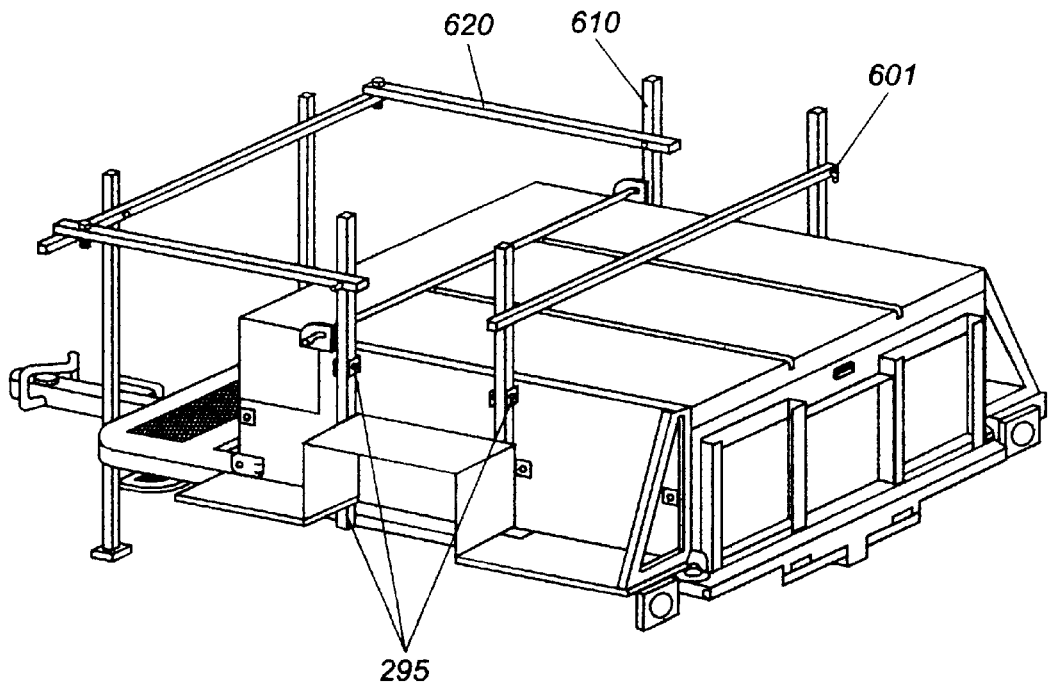
FIG. 20 is a left rear perspective view of the first preferred embodiment of the trailer of FIG. 3, post and rail system in place.

The post and rail system shown in FIG. 20 is intended to be simple and flexible, allowing the user to shape the system into a multitude of configurations to suit his needs for any specific task. For instance, in the configuration as shown the present Invention would be capable of storing and hauling an abundance of cargo inside the enclosed front and rear compartments, plus additional cargo on the front deck and fender assembly. In addition the post and rail system creates a containment area atop the back cowling platform and elevated racks which would accommodate extra long items such as ladders, or canoes and kayaks.

The posts 610 are attached in various positions to strategically located cleats 295 with cotter pins. And rails 620 are attached to posts with cotter pins 601.

A premanufactured fitting system in lieu of cleats and cotter pins would be equally effective for this purpose.

Posts and rails should be lightweight, rigid, and moderately corrosion resistant materials such as galvanized steel tubes.

Figure 21:
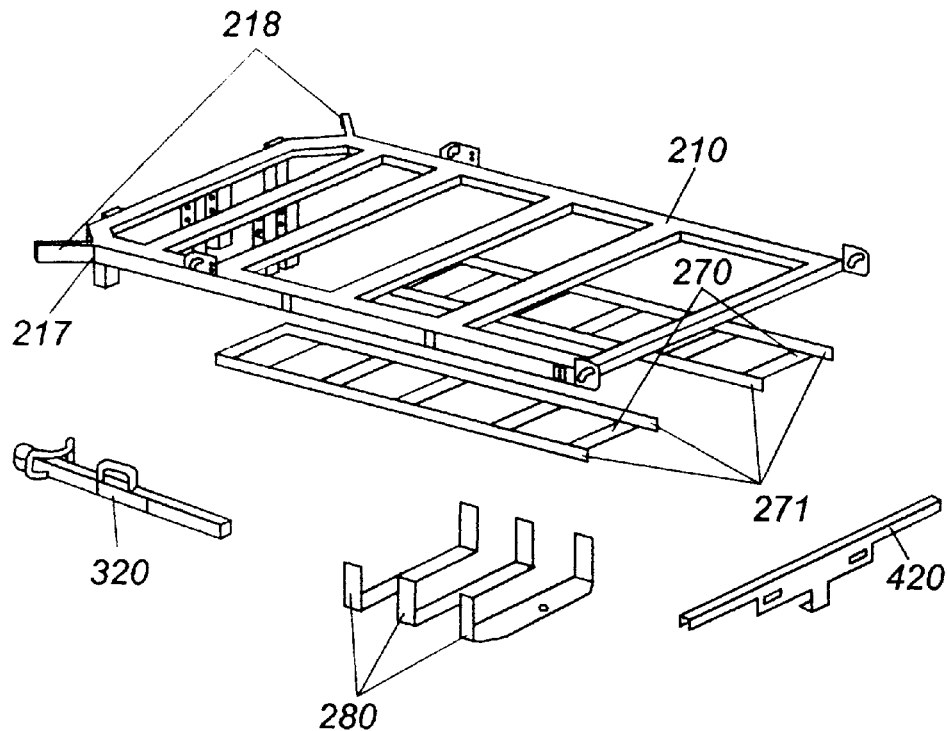
FIG. 21 is a left rear perspective exploded view of the frame assembly of the first preferred embodiment of the trailer of FIG. 3.

FIG. 21 is an exploded perspective view of the frame assembly which can be produced using stock sizes of steel channels, angles, and tubes; preferably epoxy powder coated to prevent corrosion.

The frame assembly is comprised of a main frame 210, which has swing-out braces 218 for supporting the camper floor extension flaps. The swing out braces are permanently attached to the main frame with heavy knuckle hinges 217.

The tongue 320 is detachable and can be positioned in multiple heights in the main frame.

The spare tire compartment 280 and the accessory compartments 270 are comprised of steel structure welded to the main frame 210. The purpose of the accessory compartment is for storing the post and rail system.

The removable tailcap 420 encloses the accessory and spare tire compartments by sliding in and out of slots 271 in the ends of the accessory compartments. This component should be comprised of aluminum or other non-corrosive material as it can be further utilized as a straightedge and level.

Figure 22:
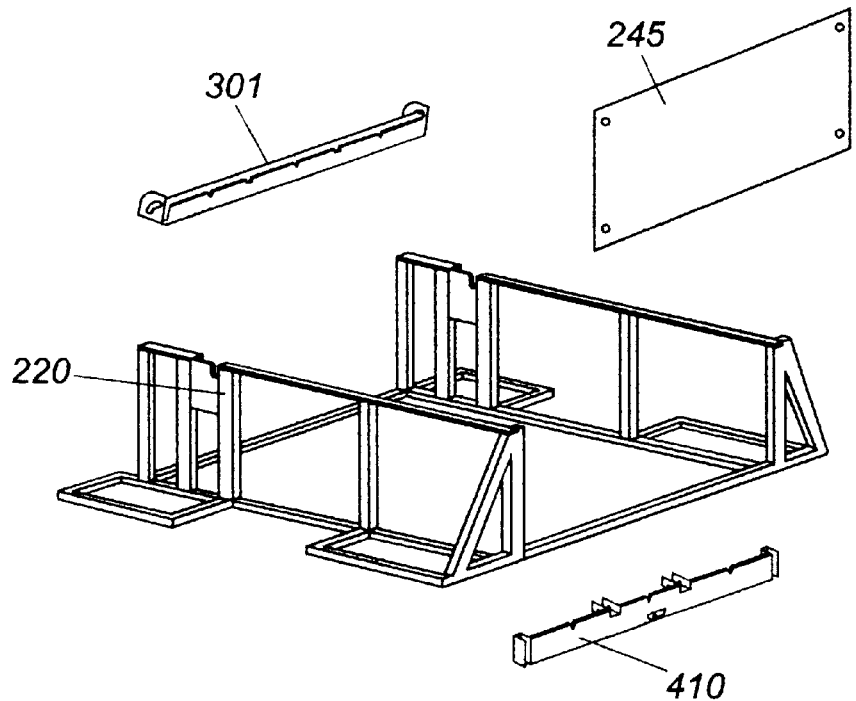
FIG. 22 is a left rear perspective exploded view of the skeletal assembly of the first preferred embodiment of the trailer of FIG. 3.

The exploded rear perspective view of FIG. 22 reveals the skeletal assembly which can be produced using stock steel angle, channel, tube, and sheet components; preferably epoxy powder coated for corrosion resistance.

The main skeleton assembly 220 will be welded to the frame assembly and the neck assembly 02 will be welded to the skeleton assembly, enhancing the rigid overall structure of the core unit.

The removable divider panel 245 is attached to the skeleton with cotter pins. This divider panel could be made from a sheet of solid phenolic resin or other rigid, weather resistant material.

The removable tailbar 410 can be attached to the skeleton with cotter pins.

Figure 23:
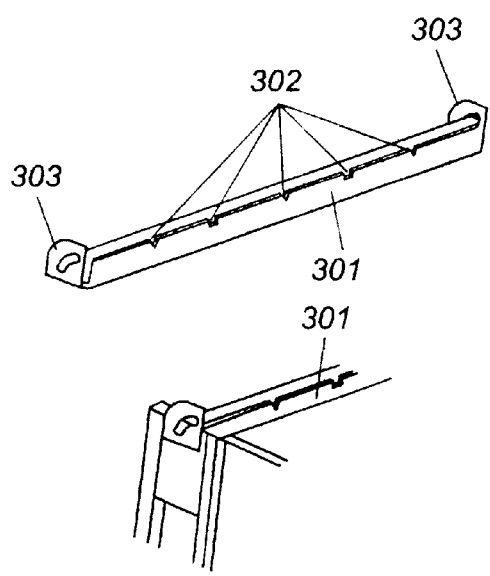
FIG. 23 is a left rear perspective view of the neck assembly of the first preferred embodiment of the trailer of FIG. 3.

In FIG. 23, the neck assembly 301 is welded to the skeleton to strengthen and stiffen the overall framework. This component should be comprised of coated steel; fabricated into a configuration such that it serves as a gutter system to divert water, and has slots and notches 302 into which the back cowling panels will fit tightly.

The hinge plates 303, welded or bolted to the ends of the neck assembly provide the method for raising and lowering the nose cowling.

Figure 24:
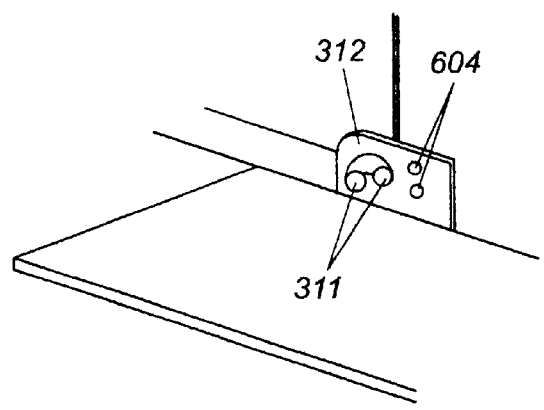
FIG. 24 is a left rear perspective view of the hinge assembly for the front door/camper floor component of the first preferred embodiment of the trailer of FIG. 3

In FIG. 24, the hinge plate 312 at the front wall/camper floor is attached to the framework with 2 bolts 604 so that the front wall/camper floor can be removed for repair or replacement.

The front wall/camper floor is nested in the up (closed) or down (floor) position by the natural forces of gravity holding the hinge rod 311 in either end of the slot in the hinge plate 312.

Figure 25:
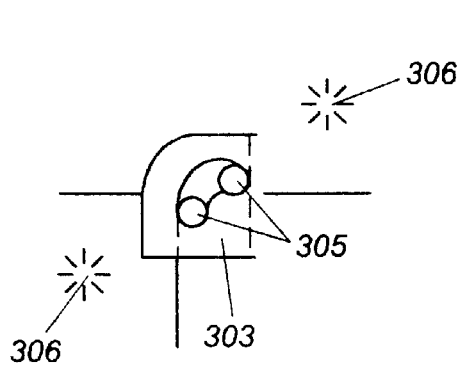
FIG. 25 is a side view of the hinge plate of the neck assembly of the first preferred embodiment of the trailer of FIG. 3.

FIG. 25 shows a close-up view of the nose cowling nested in the down (closed) position 306 or the up (open) position 306 by the natural and efficient forces of gravity holding the hinge rod 305 in either end of the slot in the hinge plate 303.

Figure 26:
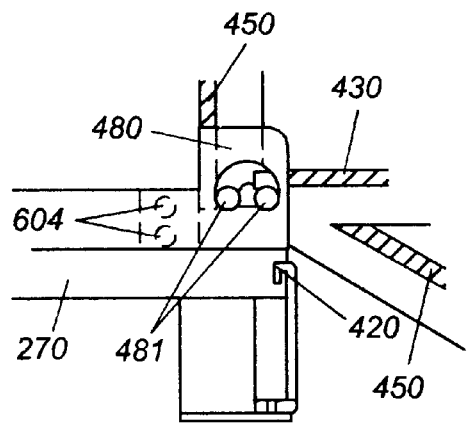
FIG. 26 is a side view of the various components of the tailgate and tailcap assembly of the first preferred embodiment of the trailer of FIG. 3.

FIG. 26 shows the tailgate 430 nested in the up (closed) position, horizontal (open) position, or down (ramp) position by the forces of gravity holding the hinge rod 481 in either end of the slot in the hinge plate 303. The hinge plate 303 is bolted to the frame with 2 bolts 604 so that the tailgate can be removed for repair or replacement.

The tailcap 420 is held firmly in position in slots in the ends of the accessory compartments 270.

Overlapping flanges 423 of the tailcap and spare tire compartment allow secure fastening with a cotter pin or padlock.

Figure 27:
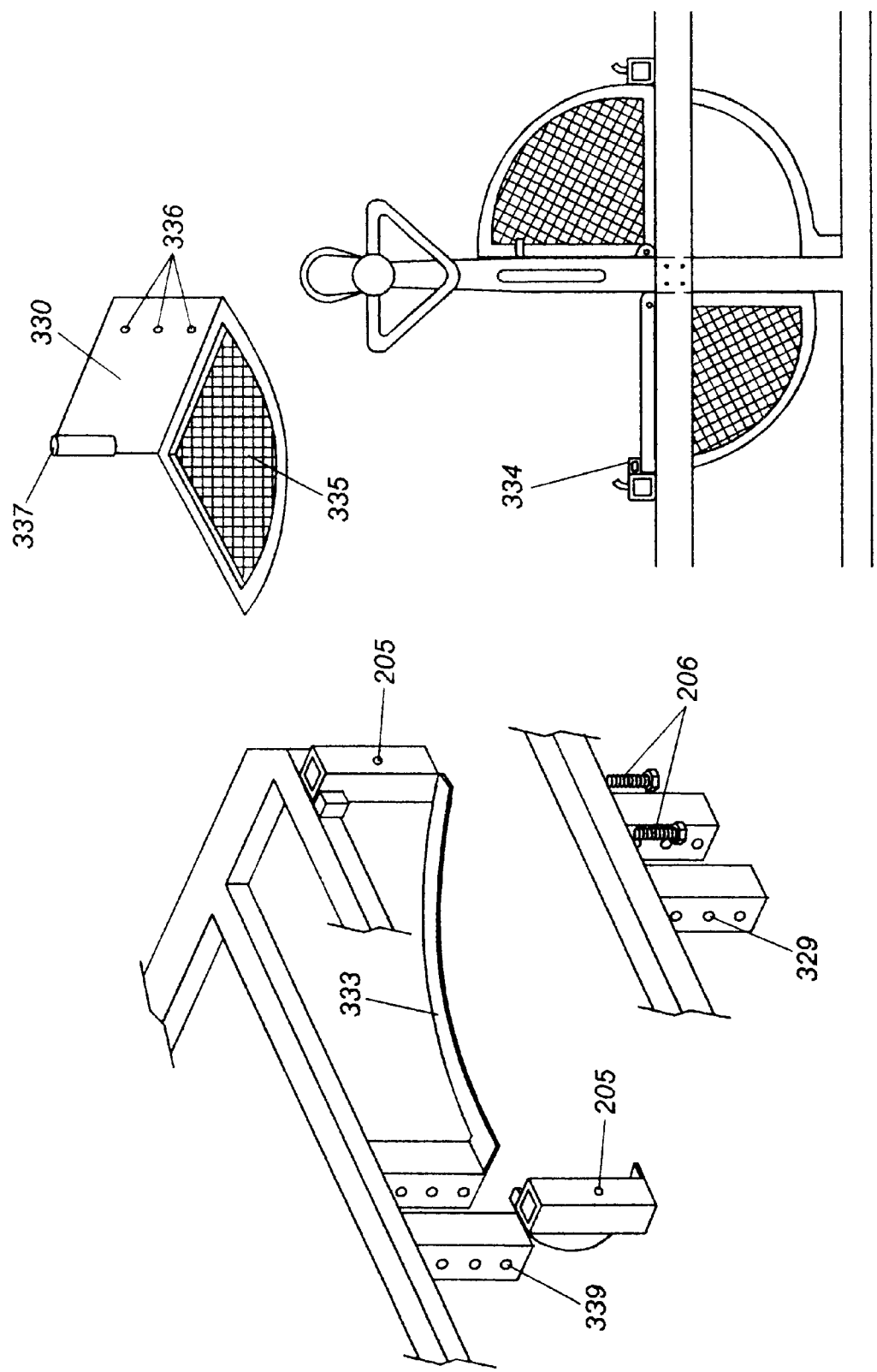
FIG. 27 is an exploded, multiperspective of interconnected sections of the frame assembly and components of the step assembly of the first preferred embodiment of the trailer of FIG. 2.

FIG. 27 is a multiple perspective for understanding the method and means of operation of the step assembly.

The exploded/cutaway view of the frame reveals how holes 339 in the frame tubes allow the tongue to be adjusted to various heights.

Step runners 333 on the frame support swing-out steps 330 which are mounted to the frame by mating the tube 337 to the pegs 206 which are welded to the frame tubes.

Each step 330 is comprised of an expanded steel stepping surface 335 which will permit mud, dirt, and other debris to fall through to the ground. This expanded steel surface will provide excellent traction and be light in weight.

Holes 336 in the step component will coincide with holes in the tongue, so that the step can be fastened to the tongue with a cotter pin in any height setting.

Holes 334 in the step runners allow the step components to be locked in the closed position with a cotter pin.

Holes 205 in these frame sleeves are for a cotter pin to lock a parking post into position within the sleeve.

In the preferred embodiment, all of the components of FIG. 27 are comprised of coated steel.

FIG. 28 shows the front wall/camper floor assembly which could be made of aluminum or coated steel.

This assembly is comprised of a primary wall panel 310 and flip out extension flaps 314.

When this assembly is up in the closed position the extension flaps will be folded in against the primary wall panel 310. Extension flap 314 is in this position.

Also, in the closed position, independent locking flaps 316 will be fastened to the frame with cotter pins, keeping the front wall locked in vertical position.

When the assembly is down, for use as a camper floor, the flaps will be extended to increase floor space. Extension flap 314 is in this position.

Each extension and locking flap is fastened to the primary wall panel with a piano hinge 315; which enables its respective extension flap and locking flap to have a full 180 degree range of motion independently of each other.

A steel rod 311 is welded to the primary wall panel 310 which traverses within the slot in the hinge plate allowing the front wall/camper floor assembly to swing open and closed.

The removable tailbar 410 of FIG. 29 is preferably comprised of coated steel and can be mounted to the framework by fastening at end channels 412 with cotter pins.

Notches 413 and channels 414 force the back cowling panels into a tight fit and holes 415 are provided for cotter pins which will lock the back cowling panels into position.

A locking tab 419 welded to the tailbar will pass through a slot in the tailgate. Fastening a cotter pin or padlock through the locking tab 06 will lock the tailgate closed.

In FIG. 30 the tailcap 420 should be comprised of aluminum or other material that is lightweight, rigid, and noncorrosive so that it can more easily be utilized as a straightedge and level with level bulbs 422.

The profile or shape of the tailcap 420 is such that it will slide securely into position through slots in the accessory compartment.

The flange 423 is shaped to overlap with the spare tire compartment to lock the tailcap into position.

FIG. 31 shows the tailgate 430 which is preferably comprised of coated steel.

The tailgate 430 will be locked in the vertical (closed) position when the tailbar locking tab is passed through the slot 429 and is secured with a cotter pin or padlock Channels 440 welded to the tailgate 430 provide additional strength and rigidity; and also form sleeves for back cowling panels to be inserted for use as ramps. Holes 441 permit cotter pins to secure back cowling panels into ramp position.

A steel rod 481 is welded to the tailgate 430; which traverses within the slot in the hinge plate allowing the tailgate to swing open and closed.

A cylindrical handle 431 provides a comfortable grip when manipulating the tailgate.

Figure 32:
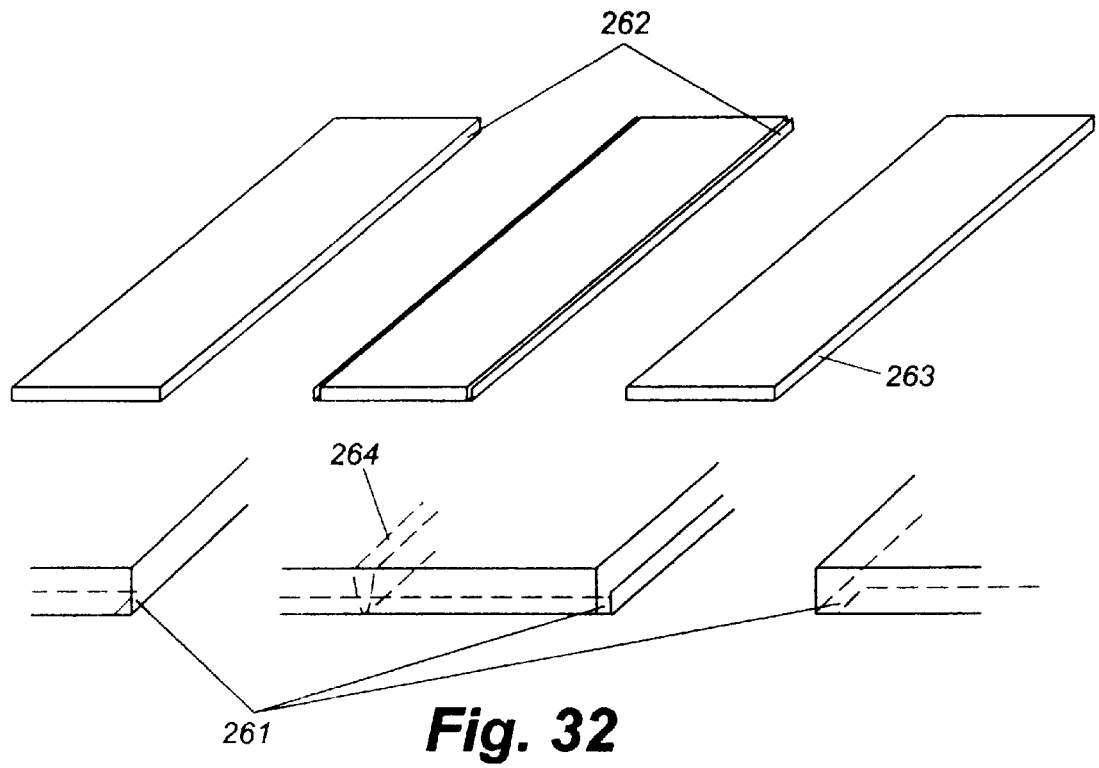
FIG. 32 is a left front perspective view of the back cowling/ramps of the first preferred embodiment of the trailer of FIG. 3.

FIG. 32 shows the individual back cowling panels which are preferably comprised of aluminum. However, a composite material such as fiberglas, plastic, or rubber can be considered; the intention being to provide relatively lightweight, yet very rigid and noncorrosive components.

Perimeter shapes of back cowling panels 261 and rib strips 264 are designed such that they interlock with each other and with the shapes of all the top edges of the rear compartment including the shapes in the top edges of the neck assembly and tailbar; to provide a snug and secure fit and to create a gutter system for diverting water or other natural elements.

These same perimeter shapes 261 and rib strips 264 also comprise a method for strengthening and stiffening the back cowling panels, making them suitable for use as loading ramps.

Holes 262 in the rear of the back cowling panels enable the panels to be locked into position on the tailbar with cotter pins.

Holes 263 in the front of the back cowling panels enable the cowling panels to be locked with cotter pins into position on the tailgate for use as loading ramps.

Figure 33:
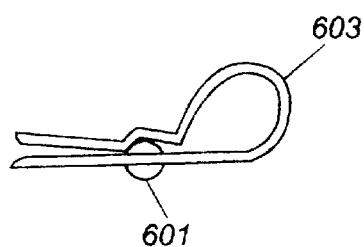
FIG. 33 is a side cutaway view of a clevis pin-to-cotter pin connection.

In FIG. 33 a cross section view shows a clevis pin 603 inserted through a cotter pin 601 to lock it into position. These parts should be comprised of stainless steel.

Figure 34:
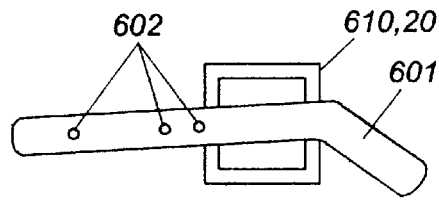
FIG. 34 is a side cutaway view of a cotter pin-to-rail connection.

FIG. 34 shows a cross section view of a cotter pin 601 inserted through a rail 620 with holes 621 for clevis pins in various positions to accommodate different post and rail arrangements.

Figure 35:
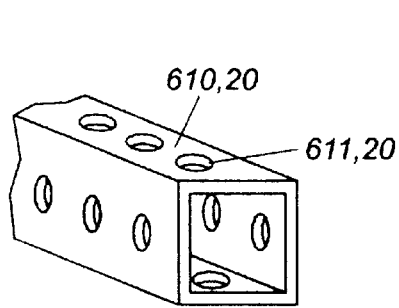
FIG. 35 is an angular perspective view of the end section of a typical post or rail of the first preferred embodiment of the trailer of FIG. 20.

FIG. 35 shows a perspective view of the end section of a typical post 610 or rail 620. This component should be of a shape and gauge to achieve an optimum mix of high strength and low weight. It is corrosion resistant, preferably being comprised of a galvanized or aluminum tube. Holes 611, 621 for cotter pin fastening are aligned on the sides of the post or rail.

Figure 36:
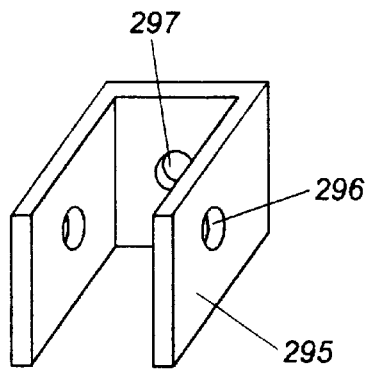
FIG. 36 is a front perspective view of a typical fastening cleat of the first preferred embodiment of the trailer of FIG. 2.

In FIG. 36 a perspective view of a cleat 295 is shown, within which posts can be attached by inserting a cotter pin through the holes 296. While this fitting could vary in shape and gauge, it is preferably comprised of steel and bolted 297 to the framework.

Figure 37:
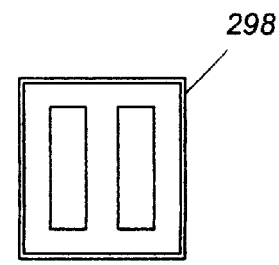
FIG. 37 is a face view of web clip of the first preferred embodiment of the trailer of FIG. 2.

The web clip 298 of FIG. 37 which is fastened to the sidewalls of the core unit accommodates straps which can be used to tie cargo to the outside of the core unit on top of the fender assembly.

The foregoing description of the preferred embodiment of the Invention has been presented for the purposes of illustration and description.

It is not intended to be exhaustive or to limit the Invention to the precise form disclosed.

Many modifications and variations are possible in light of the above teaching.

While the Invention has been particularly shown and described with reference to the preferred embodiments thereof, it will be understood by those skilled in the art that various alterations in form and detail may be made therein without departing from the spirit and scope on the Invention.

What is claimed is:

1. An apparatus for a multipurpose trailer, said apparatus comprising:

A core unit, permanently attached to a trailer wheel and axle assembly, said core unit being comprised of a frame, said frame incorporating a solid cargo floor, said assembly, frame and floor not necessarily being discrete and means for converting from any of the following three (3) configurations to any other of the following three (3) configurations, said configurations being:

a flatbed type trailer for hauling cargo or payloads, a rigid, hard enclosed type trailer for hauling cargo or payloads, and a tent camper with functional interior components.

2. An apparatus for a multipurpose trailer, said apparatus comprising:

A core unit, permanently attached to a trailer wheel and axle assembly, said core unit being comprised of a frame, said frame incorporating a solid cargo floor, said assembly, frame and floor not necessarily being discrete and a superstructure comprised of several components and means for converting from any one of three (3) configurations to any other one of those three (3) configurations by repositioning some or all of the components, said configurations comprising:

a flatbed type trailer for hauling cargo or payloads, a rigid, hard enclosed type trailer for hauling cargo or payloads, and a tent camper with functional interior components.

3. An apparatus for a multipurpose trailer, said apparatus comprising:

A core unit, permanently attached to a trailer wheel and axle assembly, said core unit being comprised of a frame, said frame incorporating a solid cargo floor, said assembly, frame and floor not necessarily being discrete and means for converting from one (1) particular configuration to another particular configuration, these two (2) particular configurations being chosen from any of the following three (3) configurations:

a flatbed type trailer for hauling cargo or payloads, a rigid, hard enclosed type trailer for hauling cargo or payloads, and a tent camper with functional interior components.

4. The apparatus of claim 2 wherein said repositioning of some or all of the components includes repositioning of components which are used for entirely different functions.

* * * * *